US012631891B2

(12) United States Patent
Kunnath et al.

(10) Patent No.: US 12,631,891 B2
(45) Date of Patent: May 19, 2026

(54) DIFFRACTION-GRATING-BASED SYSTEMS AND METHODS FOR STEREOSCOPIC AND MULTISCOPIC IMAGING

(71) Applicant: AIRY3D INC., Montreal (CA)

(72) Inventors: Neeth Kunnath, Montreal (CA); Ji-Ho Cho, Montreal (CA); Pascal Gregoire, Montreal (CA)

(73) Assignee: AIRY3D INC., Montreal (CA)

( * ) Notice: Subject to any disclaimer, the term of this patent is extended or adjusted under 35 U.S.C. 154(b) by 375 days.

(21) Appl. No.: 18/037,475

(22) PCT Filed: Nov. 18, 2021

(86) PCT No.: PCT/CA2021/051635
§ 371 (c)(1),
(2) Date: May 17, 2023

(87) PCT Pub. No.: WO2022/104467
PCT Pub. Date: May 27, 2022

(65) Prior Publication Data
US 2023/0418084 A1      Dec. 28, 2023

Related U.S. Application Data

(60) Provisional application No. 63/116,399, filed on Nov. 20, 2020.

(51) Int. Cl.
G02B 27/42          (2006.01)
G06T 7/521          (2017.01)
(Continued)

(52) U.S. Cl.
CPC .......... G02B 27/4205 (2013.01); G06T 7/521 (2017.01); G06T 7/593 (2017.01)

(58) Field of Classification Search
CPC ...... G02B 27/4205; G06T 7/521; G06T 7/593
See application file for complete search history.

(56) References Cited

U.S. PATENT DOCUMENTS

2022/0132056 A1* 4/2022 Zahnert .............. G02B 27/0101

FOREIGN PATENT DOCUMENTS

| WO | WO 2019/109182 | 6/2019 |
| WO | WO 2020/132243 | 6/2020 |
| WO | WO 2020/163662 | 8/2020 |

OTHER PUBLICATIONS

Neeth Kunnath, "Depth from Defocus using Angle Sensitive Pixels based on a Transmissive Diffraction Mask", Master thesis from Mcgill University, published Jan. 2018 (Year: 2018).*

(Continued)

*Primary Examiner* — Ross Varndell
*Assistant Examiner* — Nhut Huy Pham
(74) *Attorney, Agent, or Firm* — Barnes & Thornburg; Steven D. Shipe

(57)          ABSTRACT

Stereoscopic and multiscopic imaging methods and systems are disclosed. An example method can include capturing, with a first image capture device, first image data from a scene within a first field of view, and capturing, with a second image capture device, second image data from the scene within a second field of view overlapping with the first field of view over a stereoscopic overlap region, wherein either or both of the first and second image capture devices include a transmissive diffraction mask (TDM) configured to encode TDM depth information in the first and/or second image data. The method can also include determining stereoscopic depth information within the stereoscopic overlap region based on the first and second image data, determining the TDM depth information encoded in first and/or second image data, and generating combined depth information (Continued)

based on the stereoscopic depth information and the first and/or second TDM depth information.

24 Claims, 14 Drawing Sheets

(51)  Int. Cl.
| | |
|---|---|
| *G06T 7/593* | (2017.01) |
| *H04N 13/00* | (2018.01) |
| *H04N 13/239* | (2018.01) |

(56)  References Cited

OTHER PUBLICATIONS

Wikipedia, "Weighted sum model", https://en.wikipedia.org/wiki/Weighted_sum_model, published May 3, 2011 (Year: 2011).*

Neeth Kunnath, "Depth from Defocus using Angle Sensitive Pixels based on a Transmissive Diffraction Mask", Master thesis from Mcgill University (Year: 2018).*

Badino et al., "Integrating LIDAR into Stereo for Fast and Improved Disparity Computation," 3DIMPVT 2011: The First Joint 3DIM/3DPVT Conference, Hangzhou, China (May 16-19, 2011).

Guindel et al., "Automatic Extrinsic Calibration for Lidar-Stereo Vehicle Sensor Setups," IEEE (Jul. 27, 2017).

Koifman, "Thesis on Airy3D Depth Sensing Technology," Image Sensors World, Retrieved from the Internet at: http://image-sensors-world.blogspot.com/2019/10/thesis-on-airx3d-depth-sensing.html (Oct. 28, 2019).

Kunnath, "Depth from Defocus Using Angle Sensitive Pixels Based on a Transmissive Diffraction Mask," A thesis submitted in partial fulfillment for the degree of Master of Science, McGill University, Retrieved from the Internet at: https://escholarship.mcgill.ca/concern/theses/5t34sm788 (Jan. 2018).

Search Report & Written Opinion issued in PCT/CA2021/051635 (2022).

Wadhwa et al., "Improvements to Portrait Mode on the Google Pixel 4 and Pixel 4 XL," Google AI Blog, Retrieved from the Internet at: https://ai.googleblog.com/2019/12/improvements-to-portrait-mode-on-google.html (May 20, 2020).

* cited by examiner

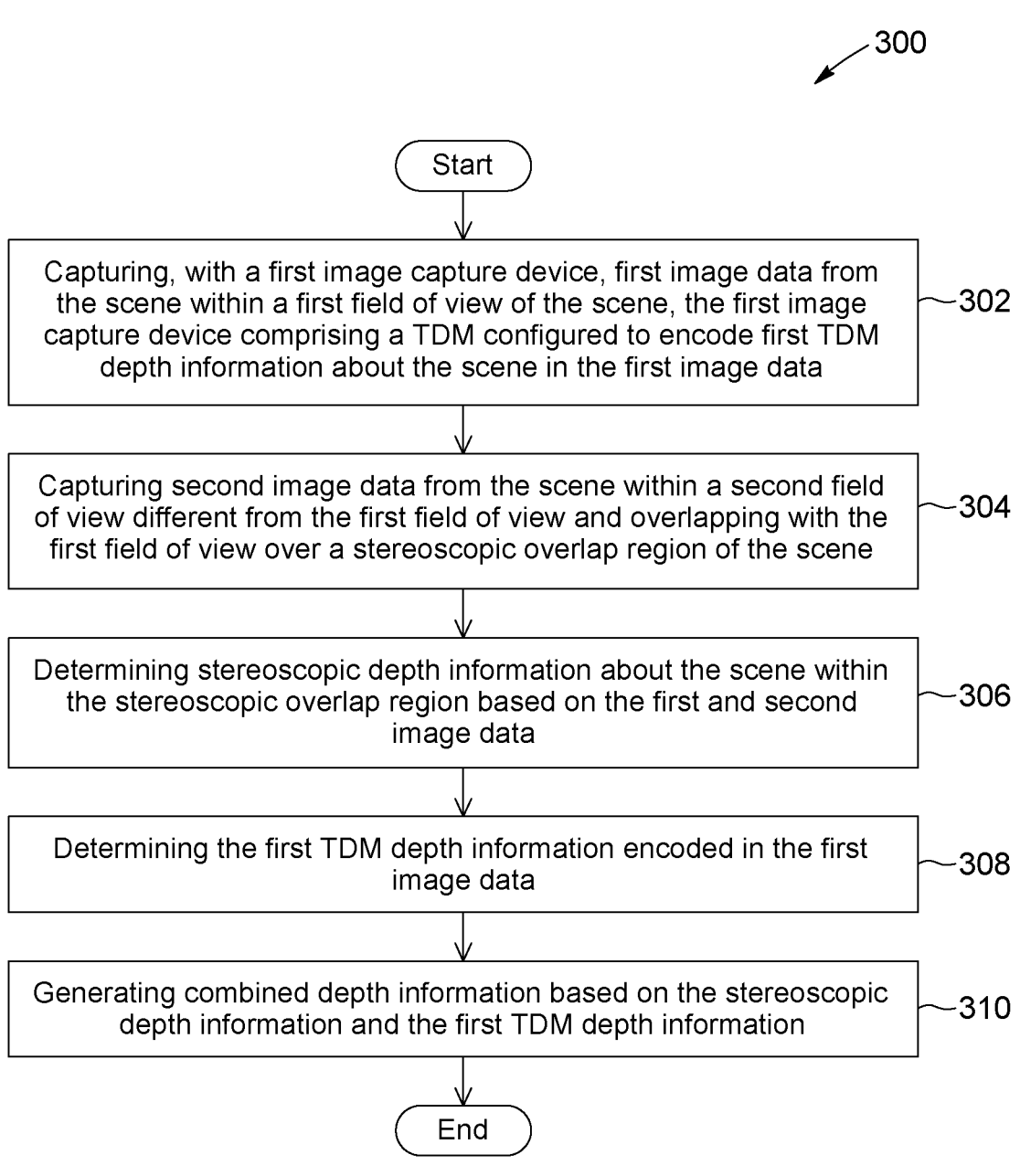

300

Start

Capturing, with a first image capture device, first image data from the scene within a first field of view of the scene, the first image capture device comprising a TDM configured to encode first TDM depth information about the scene in the first image data        302

Capturing second image data from the scene within a second field of view different from the first field of view and overlapping with the first field of view over a stereoscopic overlap region of the scene        304

Determining stereoscopic depth information about the scene within the stereoscopic overlap region based on the first and second image data        306

Determining the first TDM depth information encoded in the first image data        308

Generating combined depth information based on the stereoscopic depth information and the first TDM depth information        310

End

FIG. 14

DIFFRACTION-GRATING-BASED SYSTEMS AND METHODS FOR STEREOSCOPIC AND MULTISCOPIC IMAGING

CROSS REFERENCE TO RELATED APPLICATIONS

The present application is a national stage application under 35 U.S.C. § 371 of International Application No. PCT/CA2021/051635, filed Nov. 18, 2021, which claims priority to U.S. Provisional Patent Application No. 63/116,399 filed on Nov. 20, 2020. The above-referenced patent applications are incorporated herein by reference in their entirety.

TECHNICAL FIELD

The technical field generally relates to imaging technology, and more particularly, to systems and methods for stereoscopic and multiscopic imaging.

BACKGROUND

Traditional imaging techniques involve the projection of three-dimensional (3D) scenes onto two-dimensional (2D) planes, resulting in a loss of information, including a loss of depth information. This loss of information is a result of the nature of square-law detectors, such as charge-coupled devices (CCD) and complementary metal-oxide-semiconductor (CMOS) sensor arrays, which can only directly measure the time-averaged intensity of incident light. A variety of imaging techniques, both active and passive, have been developed that can provide 3D image information, including depth information. Non-limiting examples of 3D imaging techniques include, to name a few, stereoscopic and multiscopic imaging, time of flight, structured light, plenoptic and light field imaging, diffraction-grating-based imaging, and depth from focus or defocus. While each of these imaging techniques has certain advantages, each also has some drawbacks and limitations. Challenges therefore remain in the field of 3D imaging.

SUMMARY

The present description generally relates to systems and methods that use diffraction-grating-based imaging to provide enhanced stereoscopic and multiscopic imaging.

In accordance with an aspect, there is provided an imaging system for imaging a scene, the imaging system including:
- a plurality of image capture devices including:
  - a first image capture device having a first field of view of the scene, the first image capture device being configured to capture first image data from the scene within the first field of view, the first image capture device including a first transmissive diffraction mask (TDM) configured to encode first TDM depth information about the scene in the first image data; and
  - a second image capture device having a second field of view of the scene different from the first field of view and overlapping with the first field of view over a stereoscopic overlap region of the scene, the second image capture device being configured to capture second image data from the scene within the second field of view; and
- a computer device operatively coupled to the plurality of image capture devices, the computer device including a processor and a non-transitory computer readable storage medium having stored thereon computer readable instructions that, when executed by the processor, cause the processor to perform operations, the operations including:
- receiving the first image data from the first image capture device;
- receiving the second image data from the second image capture device;
- determining stereoscopic depth information about the scene within the stereoscopic overlap region based on the first and second image data;
- determining the first TDM depth information encoded in the first image data; and
- generating combined depth information about the scene based on the stereoscopic depth information and the first TDM depth information.

In some embodiments, the first TDM is configured to diffract a first portion of light received from the scene to generate first diffracted light, the first diffracted light encoding, as the first TDM depth information, information indicative of an angle of incidence of the received light; the first image capture device includes a first image sensor having a first set of pixels configured to detect the first diffracted light and generate therefrom a respective first set of pixel responses as the first image data; the first set of pixels includes a first subset of pixels and a second subset of pixels; the first set of pixel responses includes a first subset of pixel responses corresponding to the first subset of pixels and a second subset of pixel responses corresponding to the second subset of pixels; and the first subset of pixel responses and the second subset of pixel responses vary differently from each other as a function of the angle of incidence of the received light.

In some embodiments, the first subset of pixel responses of the first set of pixel responses have magnitudes that increase as the angle of incidence of the received light increases; and the second subset of pixel responses of the first set of pixel responses have magnitudes that decrease as the angle of incidence of the received light increases.

In some embodiments, determining the first TDM depth information includes computing a plurality of first summed pixel responses based on a sum of the first subset of pixel responses and the second subset of pixel responses of the first set of pixel responses; computing a plurality of first differential pixel responses based on a difference between the first subset of pixel responses and the second subset of pixel responses of the first set of pixel responses; and determining a first TDM disparity map based on the plurality of first summed pixel responses and the plurality of first differential pixel responses.

In some embodiments, determining the first TDM depth information includes determining a first TDM disparity map from the first set of pixel responses, the first TDM disparity map being representative of a difference in viewpoints of the scene provided by the first subset of pixel responses and the second subset of pixel responses of the first set of pixel responses.

In some embodiments, the first TDM disparity map includes a first TDM baseline that is parallel to a stereoscopic baseline between the first image capture device and the second image capture device. In other embodiments, the first TDM disparity map includes a first TDM baseline that is perpendicular to a stereoscopic baseline between the first image capture device and the second image capture device.

In some embodiments, determining the first TDM depth information includes determining a first TDM depth map from the first TDM disparity map.

In some embodiments, the first TDM includes a series of alternating ridges and grooves extending along a first grating axis at a first grating period. In some embodiments, the first set of pixels has a first pixel pitch along the first grating axis, the first pixel pitch being half of the first grating period.

In some embodiments, the stereoscopic depth information about the scene is determined based on, from the first image data, the first subset of pixel responses, or the second subset of pixel responses, or a sum of the first and second subsets of pixel responses, or a difference between the first and second subsets of pixels, or any combination thereof.

In some embodiments, the first TDM includes a first set of diffraction gratings having a first grating orientation and a second set of diffraction gratings having a second grating orientation, wherein the first grating orientation is orthogonal to the second grating orientation.

In some embodiments, generating the combined depth information includes assigning a stereoscopic confidence weight to the stereoscopic depth information to obtain weighted stereoscopic depth information; assigning a first TDM confidence weight to the first TDM depth information to obtain first weighted TDM depth information; and generating the combined depth information based on the weighted stereoscopic depth information and the first weighted TDM depth information.

In some embodiments, the stereoscopic confidence weight and the first TDM confidence weight are assigned based on an object distance, an object position within the first and/or the second field of view, a left-right consistency parameter associated with the stereoscopic depth information, an object orientation with respect to a stereoscopic baseline orientation associated with the stereoscopic depth information and to a TDM baseline orientation associated with the TDM depth information, an object occlusion parameter, or a combination thereof.

In some embodiments, the operations performed by the processor further include identifying a mismatch between the stereoscopic depth information and the first TDM depth information; and determining a cause of the mismatch as relating to an anomaly in either the stereoscopic depth information or the first TDM depth information based on the stereoscopic confidence weight assigned to the stereoscopic depth information and the first TDM confidence weight assigned to the first TDM depth information.

In some embodiments, the operations performed by the processor further include determining a stereoscopic disparity search range based on the first TDM depth information; and determining the stereoscopic depth information based on the stereoscopic disparity search range. In some embodiments, determining the stereoscopic disparity search range based on the first TDM depth information includes determining an uncertainty measure associated with the first TDM depth information; and determining the stereoscopic disparity search based on the uncertainty measure.

In some embodiments, the second image capture device includes a second TDM configured to encode second TDM depth information about the scene in the second image data; and the operations performed by the processor further include determining the second TDM depth information encoded in the second image data; and generating the combined depth information based further on the second TDM depth information.

In some embodiments, the second TDM is configured to diffract a second portion of light received from the scene to generate second diffracted light, the second diffracted light encoding, as the second TDM depth information, information indicative of an angle of incidence of the received light; the second image capture device includes a second image sensor having a second set of pixels configured to detect the second diffracted light and generate therefrom a respective second set of pixel responses as the second image data; the second set of pixels includes a first subset of pixels and a second subset of pixels; the second set of pixel responses includes a first subset of pixel responses corresponding to the first subset of pixels and a second subset of pixel responses corresponding to the second subset of pixels; and the first subset of pixel responses and the second subset of pixel responses vary differently from each other as a function of the angle of incidence of the received light.

In some embodiments, the first subset of pixel responses of the second set of pixel responses have magnitudes that increase as the angle of incidence of the received light increases; and the second subset of pixel responses of the second set of pixel responses have magnitudes that decrease as the angle of incidence of the received light increases.

In some embodiments, computing a plurality of second summed pixel responses based on a sum of the first subset of pixel responses and the second subset of pixel responses of the second set of pixel responses; computing a plurality of second differential pixel responses based on a difference between the first subset of pixel responses and the second subset of pixel responses of the second set of pixel responses; and determining a second TDM disparity map based on the plurality of second summed pixel responses and the plurality of second differential pixel responses.

In some embodiments, determining the second TDM depth information includes determining a second TDM disparity map from the second set of pixel responses, the second TDM disparity map being representative of a difference in viewpoints of the scene provided by the first subset of pixel responses and the second subset of pixel responses of the second set of pixel responses.

In some embodiments, the second TDM includes a series of alternating ridges and grooves extending along a second grating axis at a second grating period. In some embodiments, the second set of pixels has a second pixel pitch along the second grating axis, the second pixel pitch being half of the second grating period.

In some embodiments, the stereoscopic depth information about the scene is determined based on, from the second image data, the first subset of pixel responses, or the second subset of pixel responses, or a sum of the first and second subsets of pixel responses, or a difference between the first and second subsets of pixels, or any combination thereof.

In some embodiments, generating the combined depth information includes assigning a stereoscopic confidence weight to the stereoscopic depth information to obtain weighted stereoscopic depth information; assigning a first TDM confidence weight to the first TDM depth information to obtain first weighted TDM depth information; assigning a second TDM confidence weight to the second TDM depth information to obtain second weighted TDM depth information; and generating the combined depth information based on the weighted stereoscopic depth information, the first weighted TDM depth information, and the second weighted TDM depth information.

In some embodiments, the stereoscopic confidence weight, the first TDM confidence weight, and the second TDM confidence weight are assigned based on a stereoscopic baseline orientation associated with the stereoscopic depth information, a first TDM baseline orientation associated with the first TDM depth information, and a second TDM baseline orientation associated with the second TDM depth information, respectively.

In some embodiments, the operations performed by the processor further include identifying a mismatch among the stereoscopic depth information, the first TDM depth information, and the second TDM depth information; and determining a cause of the mismatch as relating to an anomaly in at least one of the stereoscopic depth information, the first TDM depth information, and the second TDM depth information based on the stereoscopic confidence weight assigned to the stereoscopic depth information, the first TDM confidence weight assigned to the first TDM depth information, and the second TDM confidence weight assigned to the second TDM depth information.

In some embodiments, the operations performed by the processor further include determining a stereoscopic disparity search range based on the first TDM depth information and/or the second TDM depth information; and determining the stereoscopic depth information based on the stereoscopic disparity search range.

In some embodiments, the plurality of image capture devices further includes a third image capture device having a third field of view of the scene different from the first and second fields of view, the first, second, and third fields of view overlap over a multiscopic overlap region of the scene, and the third image capture device is configured to capture third image data from the scene within the third field of view; and the operations performed by the processor further include determining multiscopic depth information about the scene within the multiscopic overlap region based on the first, second, and third image data; and generating the combined depth information based further on the multiscopic depth information.

In some embodiments, the third image capture device includes a third TDM configured to encode third TDM depth information about the scene in the third image data; and the operations performed by the processor further include determining the third TDM depth information encoded in the third image data; and generating the combined depth information based further on the third TDM depth information.

In some embodiments, the first field of view has a first optical axis, and the second field of view has a second optical axis that is parallel to the first optical axis. In other embodiments, the first field of view has a first optical axis, and the second field of view has a second optical axis that is non-parallel to the first optical axis.

In accordance with another aspect, there is provided an imaging method of imaging a scene, the imaging method including:

capturing, with a first image capture device, first image data from the scene within a first field of view of the scene, the first image capture device including a first transmissive diffraction mask (TDM) configured to encode first TDM depth information about the scene in the first image data;

capturing second image data from the scene within a second field of view different from the first field of view and overlapping with the first field of view over a stereoscopic overlap region of the scene;

determining stereoscopic depth information about the scene within the stereoscopic overlap region based on the first and second image data;

determining the first TDM depth information encoded in the first image data; and generating combined depth information based on the stereoscopic depth information and the first TDM depth information.

In some embodiments, capturing the first image data includes diffracting, with the first TDM, a first portion of light received from the scene to generate first diffracted light, the first diffracted light encoding, as the first TDM depth information, information indicative of an angle of incidence of the received light; and detecting, with a first set of pixels of the first image capture device, the diffracted light and generating therefrom a respective first set of pixel responses as the first image data, wherein the first set of pixel responses includes a first subset of pixel responses and a second subset of pixel responses, and wherein the first subset of pixel responses and the second subset of pixel responses vary differently from each other as a function of the angle of incidence of the received light.

In some embodiments, the first subset of pixel responses of the first set of pixel responses have magnitudes that increase as the angle of incidence of the received light increases; and the second subset of pixel responses of the first set of pixel responses have magnitudes that decrease as the angle of incidence of the received light increases.

In some embodiments, determining the first TDM depth information includes computing a plurality of first summed pixel responses based on a sum of the first subset of pixel responses and the second subset of pixel responses of the first set of pixel responses; computing a plurality of first differential pixel responses based on a difference between the first subset of pixel responses and the second subset of pixel responses of the first set of pixel responses; and determining a first TDM disparity map based on the plurality of first summed pixel responses and the plurality of first differential pixel responses.

In some embodiments, determining the first TDM depth information includes determining a first TDM disparity map from the first set of pixel responses, the first TDM disparity map being representative of a difference in viewpoints of the scene provided by the first subset of pixel responses and the second subset of pixel responses of the first set of pixel responses.

In some embodiments, determining the first TDM depth information includes determining a first TDM depth map from the first TDM disparity map.

In some embodiments, the stereoscopic depth information about the scene is determined based on, from the first image data, the first subset of pixel responses, or the second subset of pixel responses, or a sum of the first and second subsets of pixel responses, or a difference between the first and second subsets of pixels, or any combination thereof.

In some embodiments, generating the combined depth information includes assigning a stereoscopic confidence weight to the stereoscopic depth information to obtain weighted stereoscopic depth information; assigning a first TDM confidence weight to the first TDM depth information to obtain first weighted TDM depth information; and generating the combined depth information based on the weighted stereoscopic depth information and the first weighted TDM depth information.

In some embodiments, the stereoscopic confidence weight and the first TDM confidence weight are assigned on a per-pixel basis.

In some embodiments, the stereoscopic confidence weight and the first TDM confidence weight are assigned based on an object distance, an object position within the first and/or the second field of view, a left-right consistency parameter associated with the stereoscopic depth information, an object orientation with respect to a stereoscopic baseline orientation associated with the stereoscopic depth information and to a TDM baseline orientation associated with the TDM depth information, an object occlusion parameter, or a combination thereof.

In some embodiments, within an imaging distance range, the stereoscopic confidence weight and the first TDM confidence weight respectively increases and decreases as the object distance increases.

In some embodiments, 42. the stereoscopic confidence weight increases as a proximity of the object position relative to a center of the stereoscopic overlap region increases; and the first TDM confidence weight increases as a proximity of the object position relative to a center of the first field of view increases.

In some embodiments, the imaging method further includes identifying a mismatch between the stereoscopic depth information and the first TDM depth information; and determining a cause of the mismatch as relating to an anomaly in either the stereoscopic depth information or the first TDM depth information based on the stereoscopic confidence weight assigned to the stereoscopic depth information and the first TDM confidence weight assigned to the first TDM depth information. In some embodiments, the imaging method further includes taking a corrective action to correct, at least in part, the anomaly. In some embodiments, the corrective action includes a recalibration operation.

In some embodiments, the imaging method further includes determining a stereoscopic disparity search range based on the first TDM depth information; and determining the stereoscopic depth information based on the stereoscopic disparity search range. In some embodiments, determining the stereoscopic disparity search range based on the first TDM depth information includes determining an uncertainty measure associated with the first TDM depth information; and determining the stereoscopic disparity search based on the uncertainty measure.

In some embodiments, capturing the first image data is performed concurrently with capturing the second image data. In other embodiments, capturing the first image data and capturing the second image data are performed during non-overlapping time periods.

In some embodiments, the second image data is captured with the first image capture device. In other embodiments, the second image data is captured with a second image capture device distinct from the first image capture device.

In some embodiments, the second image capture device includes a second TDM configured to encode second TDM depth information about the scene in the second image data; and the imaging method further includes determining the second TDM depth information encoded in the second image data; and generating the combined depth information based further on the second TDM depth information.

In some embodiments, capturing the second image data includes diffracting, with the second TDM, a second portion of light received from the scene to generate second diffracted light, the second diffracted light encoding, as the second TDM depth information, information indicative of an angle of incidence of the received light; and detecting, with a second set of pixels of the second image capture device, the diffracted light and generating therefrom a respective second set of pixel responses as the second image data, wherein the second set of pixel responses includes a first subset of pixel responses and a second subset of pixel responses, and wherein the first subset of pixel responses and the second subset of pixel responses vary differently from each other as a function of the angle of incidence of the received light.

In some embodiments, the first subset of pixel responses of the second set of pixel responses have magnitudes that increase as the angle of incidence of the received light increases, and the second subset of pixel responses of the second set of pixel responses have magnitudes that decrease as the angle of incidence of the received light increases.

In some embodiments, determining the second TDM depth information includes computing a plurality of second summed pixel responses based on a sum of the first subset of pixel responses and the second subset of pixel responses of the second set of pixel responses; computing a plurality of second differential pixel responses based on a difference between the first subset of pixel responses and the second subset of pixel responses of the second set of pixel responses; and determining a second TDM disparity map based on the plurality of second summed pixel responses and the plurality of second differential pixel responses.

In some embodiments, determining the second TDM depth information includes determining a second TDM disparity map from the second set of pixel responses, the second TDM disparity map being representative of a difference in viewpoints of the scene provided by the first subset of pixel responses and the second subset of pixel responses of the second set of pixel responses.

In some embodiments, the stereoscopic depth information about the scene is determined based on, from the second image data, the first subset of pixel responses, or the second subset of pixel responses, or a sum of the first and second subsets of pixel responses, or a difference between the first and second subsets of pixels, or any combination thereof.

In some embodiments, generating the combined depth includes assigning a stereoscopic confidence weight to the stereoscopic depth information to obtain weighted stereoscopic depth information; assigning a first TDM confidence weight to the first TDM depth information to obtain first weighted TDM depth information; assigning a second TDM confidence weight to the second TDM depth information to obtain second weighted TDM depth information; and generating the combined depth information based on the weighted stereoscopic depth information, the first weighted TDM depth information, and the second weighted TDM depth information.

In some embodiments, the stereoscopic confidence weight, the first TDM confidence weight, and the second TDM confidence weight are assigned based on a stereoscopic baseline orientation associated with the stereoscopic depth information, a first TDM baseline orientation associated with the first TDM depth information, and a second TDM baseline orientation associated with the second TDM depth information, respectively.

In some embodiments, the imaging method further includes identifying a mismatch among the stereoscopic depth information, the first TDM depth information, and the second TDM depth information; and determining a cause of the mismatch as relating to an anomaly in at least one of the stereoscopic depth information, the first TDM depth information, and the second TDM depth information based on the stereoscopic confidence weight assigned to the stereoscopic depth information, the first TDM confidence weight assigned to the first TDM depth information, and the second TDM confidence weight assigned to the second TDM depth information. In some embodiments, the imaging method further includes taking a corrective action to correct, at least in part, the anomaly. In some embodiments, the corrective action includes a recalibration operation.

In some embodiments, the imaging method further includes determining a stereoscopic disparity search range based on the first TDM depth information and/or the second TDM depth information; and determining the stereoscopic depth information based on the stereoscopic disparity search range.

In some embodiments, the imaging method further includes capturing third image data from the scene within a third field of view different from the first and second fields of view and overlapping with the first and second fields of view over a multiscopic overlap region of the scene, determining multiscopic depth information about the scene within the multiscopic overlap region based on the first, second, and third image data; and generating the combined depth information based further on the multiscopic depth information.

In accordance with another aspect, there is provided a stereoscopic imaging method of imaging a scene, the stereoscopic imaging method including capturing first image data from light received from the scene within a first field of view of the scene, and capturing second image data from light received from the scene within a second field of view of the scene different from the first field of view and overlapping with the first field of view over a stereoscopic overlap region of the scene, wherein either or both of the first image data and the second image data includes a first subset of pixel responses and a second subset of pixel responses that vary differently from each other as a function of angle of incidence of the received light to encode depth information about the scene; determining a stereoscopic disparity search range based on the encoded depth information; and determining stereoscopic depth information about the scene within the stereoscopic overlap region by performing a stereoscopic matching operation between the first image data and the second image data based on the stereoscopic disparity search range.

In some embodiments, encoding the depth information about the scene in the first subset of pixel responses and the second subset of pixel responses includes passing the light received from the scene through a transmissive diffraction mask.

In accordance with another aspect, there is provided a non-transitory computer readable storage medium having stored thereon computer readable instructions that, when executed by a processor, cause the processor to perform operations, the operations including:

receiving first image data captured with a first image capture device having a first field of view of a scene, the first image capture device including a first transmissive diffraction mask (TDM) configured to encode first TDM depth information about the scene in the first image data;

receiving second image data within a second field of view of the scene different from the first field of view and overlapping with the first field of view over a stereoscopic overlap region of the scene;

determining stereoscopic depth information about the scene within the stereoscopic overlap region based on the first and second image data;

determining the first TDM depth information about the scene encoded in the first image data; and generating combined depth information about the scene based on the stereoscopic depth information and the first TDM depth information.

In some embodiments, generating the combined depth information includes assigning a stereoscopic confidence weight to the stereoscopic depth information to obtain weighted stereoscopic depth information; assigning a first TDM confidence weight to the first TDM depth information to obtain first weighted TDM depth information; and generating the combined depth information based on the weighted stereoscopic depth information and the first weighted TDM depth information.

In some embodiments, the stereoscopic confidence weight and the first TDM confidence weight are assigned based on an object distance, an object position within the first and/or the second field of view, or a combination thereof.

In some embodiments, the operations further include identifying a mismatch between the stereoscopic depth information and the first TDM depth information; and determining a cause of the mismatch as relating to an anomaly in either the stereoscopic depth information or the first TDM depth information based on the stereoscopic confidence weight assigned to the stereoscopic depth information and the first TDM confidence weight assigned to the first TDM depth information.

In some embodiments, the operations further include determining a stereoscopic disparity search range based on the first TDM depth information; and determining the stereoscopic depth information based on the stereoscopic disparity search range.

In some embodiments determining the stereoscopic disparity search range based on the first TDM depth information includes determining an uncertainty measure associated with the first TDM depth information; and determining the stereoscopic disparity search based on the uncertainty measure.

In some embodiments, the second image data encodes second TDM depth information about the scene, and the operations further include determining the second TDM depth information encoded in the second image data and generating the combined depth information based further on the second TDM depth information.

In accordance with another aspect, there is provided a computer device including a processor and a non-transitory computer readable storage medium such as described herein, the non-transitory computer readable storage medium being operatively coupled to the processor.

It is appreciated that other method and process steps may be performed prior, during or after the steps described herein. The order of one or more steps may also differ, and some of the steps may be omitted, repeated, and/or combined, as the case may be. It is also to be noted that some steps may be performed using various analysis and processing techniques, which may be implemented in hardware, software, firmware, or any combination thereof.

Other objects, features, and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features may be combined with one another unless stated otherwise.

BRIEF DESCRIPTION OF THE DRAWINGS

FIG. 7 also depicts curves of the sum $I_{sum}=I_++I_-$ and the difference $I_{diff}=I_+-I_-$ of the odd and even pixel responses as functions of θ.

FIG. 14 is a flow diagram of a method of imaging a scene, in accordance with an embodiment.

DETAILED DESCRIPTION

Figure 1:
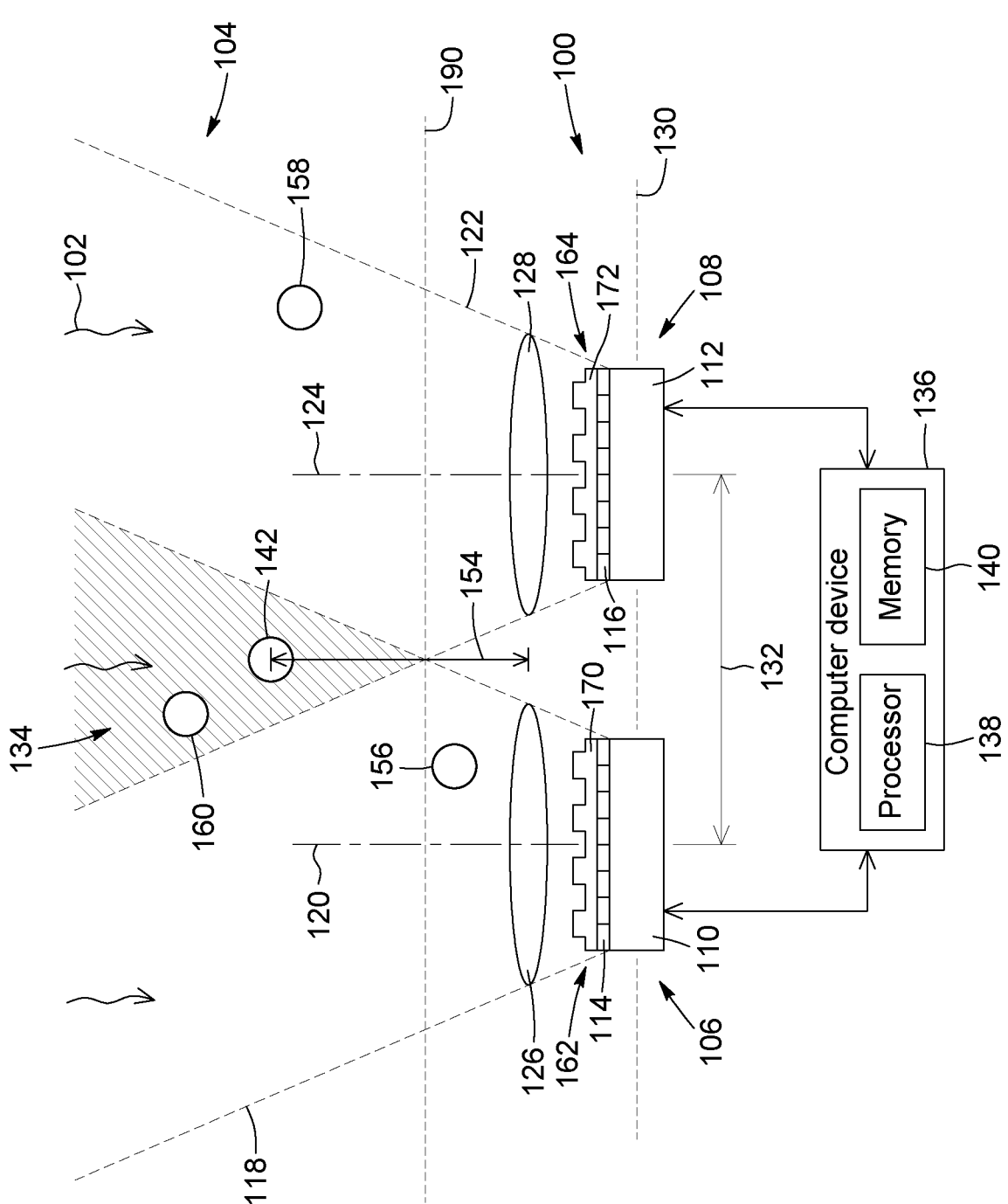
FIG. 1 is a schematic top plan view of an imaging system, in accordance with an embodiment.

In the present description, similar features in the drawings have been given similar reference numerals. To avoid cluttering certain figures, some elements may not be indicated if they were already identified in a preceding figure. The elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. It is appreciated that such spatially relative terms are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an", and "one" are defined herein to mean "at least one", that is, these terms do not exclude a plural number of elements, unless stated otherwise.

The term "or" is defined herein to mean "and/or", unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or an equivalent function or result). In some instances, the term "about" means a variation of ±10% of the stated value. It is noted that all numeric values used herein are assumed to be modified by the term "about", unless stated otherwise. The term "between" as used herein to refer to a range of numbers or values defined by endpoints is intended to include both endpoints, unless stated otherwise.

The term "based on" as used herein is intended to mean "based at least in part on", whether directly or indirectly, and to encompass both "based solely on" and "based partly on". In particular, the term "based on" may also be understood as meaning "depending on", "representative of", "indicative of", "associated with", and the like.

The terms "match", "matching", and "matched" refer herein to a condition in which two elements are either the same or within some predetermined tolerance of each other. That is, these terms are meant to encompass not only "exactly" or "identically" matching the two elements but also "substantially", "approximately", or "subjectively" matching the two elements, as well as providing a higher or best match among a plurality of matching possibilities.

The terms "connected" and "coupled", and derivatives and variants thereof, refer herein to any connection or coupling, either direct or indirect, between two or more elements, unless stated otherwise. For example, the connection or coupling between elements may be mechanical, optical, electrical, magnetic, thermal, chemical, logical, fluidic, operational, or any combination thereof.

The term "concurrently" refers herein to two or more processes that occur during coincident or overlapping time periods. The term "concurrently" does not necessarily imply complete synchronicity and encompasses various scenarios including time-coincident or simultaneous occurrence of two processes; occurrence of a first process that both begins and ends during the duration of a second process; and occurrence of a first process that begins during the duration of a second process, but ends after the completion of the second process.

The terms "light" and "optical", and variants and derivatives thereof, refer herein to radiation in any appropriate region of the electromagnetic spectrum. These terms are not limited to visible light, but may also include invisible regions of the electromagnetic spectrum including, without limitation, the terahertz (THz), infrared (IR), and ultraviolet (UV) regions. By way of example, in some embodiments, the present techniques may be used with electromagnetic radiation having a center wavelength ranging 175 nanometers (nm) in the deep ultraviolet to about 300 micrometers (μm) in the terahertz range, for example, from about 400 nm at the blue end of the visible spectrum to about 1550 nm at telecommunication wavelengths, or between about 400 nm and about 650 nm to match the spectral range of typical red-green-blue (RGB) color filters. It is appreciated, however, that these wavelength ranges are provided for illustrative purposes, and that the present techniques may operate beyond these ranges.

The present description generally relates to systems and methods that use diffraction-grating-based imaging to supplement or enhance stereoscopic and multiscopic depth sensing. The terms "stereoscopic imaging" and "multiscopic imaging" refers herein to imaging techniques operable to acquire 3D image information of a scene from two or more images acquired from different viewpoints.

The present techniques may be used in various applications that may need or benefit from enhanced stereoscopic and multiscopic imaging. Non-limiting examples of possible fields of application include, to name a few, consumer electronics (e.g., mobile phones, tablets, laptops, webcams, and notebooks, gaming, virtual and augmented reality, photography), automotive applications (e.g., advanced driver assistance systems, in-cabin monitoring), industrial applications (e.g., inspection, robot guidance, object identification and tracking), and security and surveillance (e.g., motion tracking; traffic monitoring; drones; agricultural inspection with aerial and ground-based drones; physical access).

Various aspects and implementations of the present techniques are described below with reference to the figures.

Figure 2:
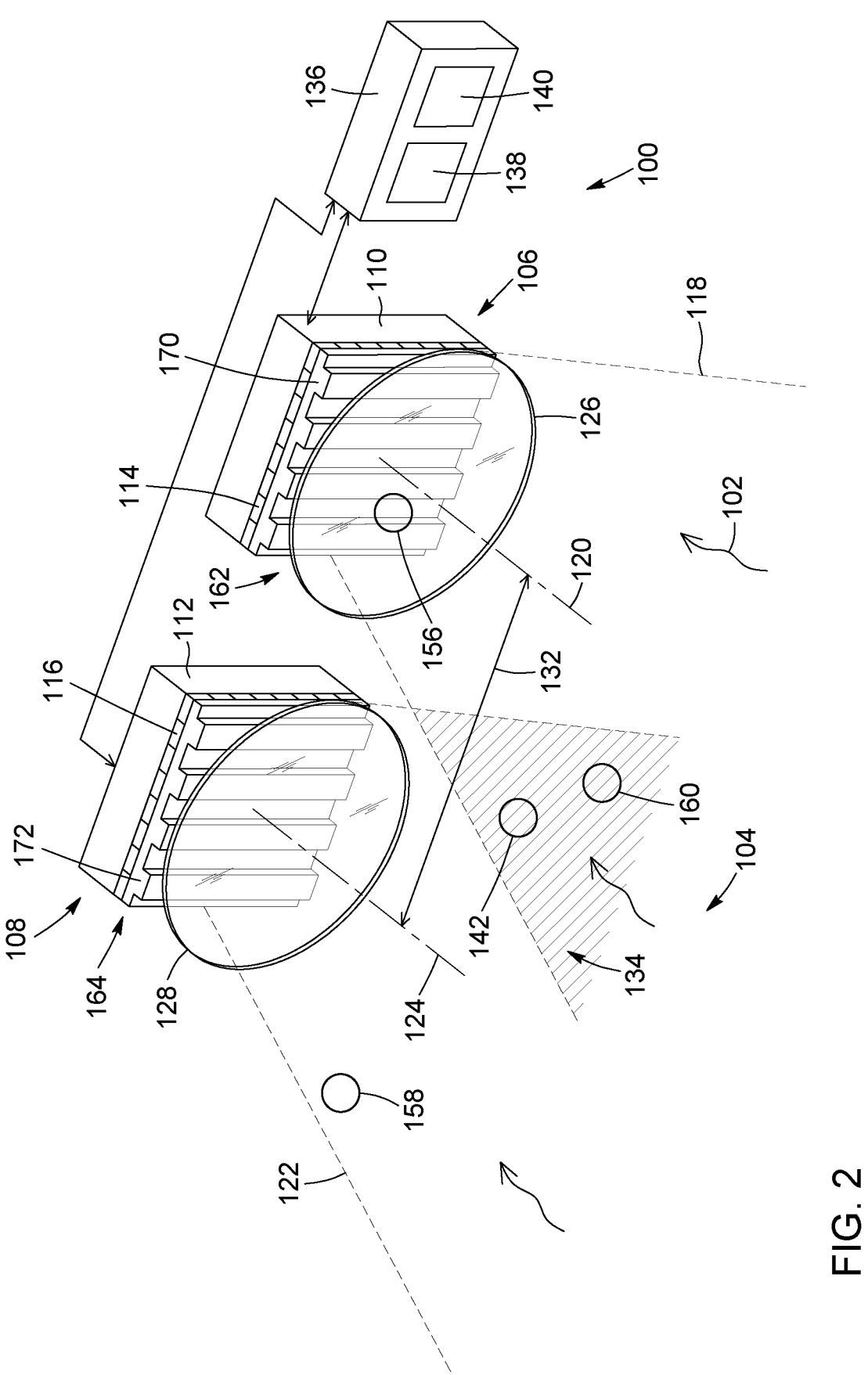
FIG. 2 is a schematic perspective view of the imaging system of FIG. 1
Figure 3:
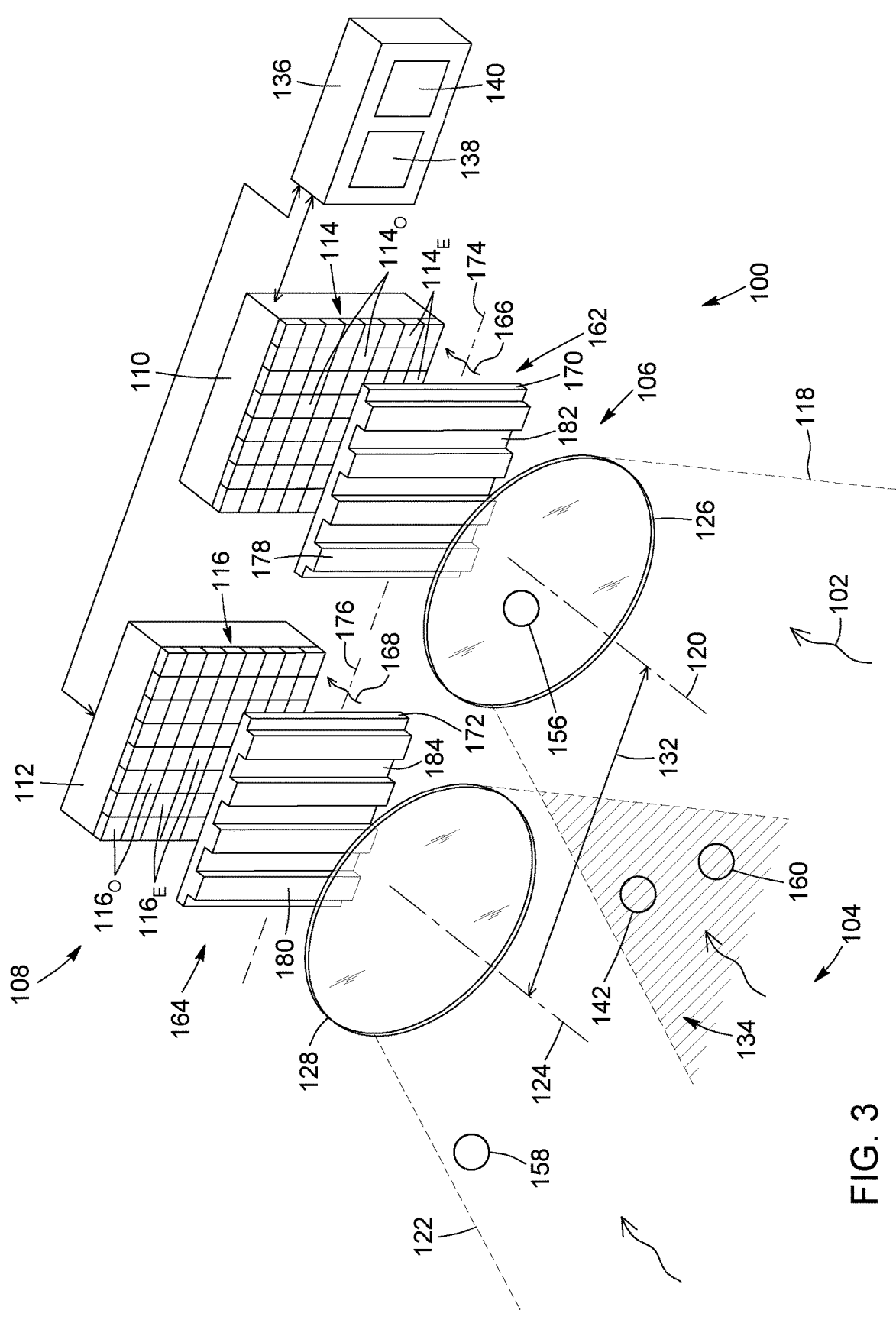
FIG. 3 is a schematic partially exploded perspective view of the imaging system of FIG. 1.

Referring to FIGS. 1 to 3, there are illustrated schematic representations of an embodiment of an imaging system 100 for capturing image data representative of light 102 received from a scene 104. The captured image data can convey depth information about the scene 104. The term "scene" refers herein to any region, space, surface, environment, object, target, or information of interest which may be imaged according to the present techniques.

The imaging system 100 includes a first image capture device 106 and a second image capture device 108 configured to image the scene 104 from two different viewpoints. As such, the imaging system 100 illustrated in FIGS. 1 to 3 may be referred to as a stereoscopic imaging system. In other embodiments, an imaging system may include more than two image capture devices configured to image a scene from more than two different viewpoints. In such embodiments, the imaging system may be referred to as a multiscopic imaging system.

In some embodiments, the first image capture device 106 and the second image capture device 108 may be incorporated in a same device. Non-limiting examples of such devices include, to name a few, smartphones, tablets, laptops, virtual and augmented reality headsets, and handheld dimensioning devices. In some embodiments, the first image capture device 106 and the second image capture device 108 may be mounted to a vehicle, for example, to side mirrors or at any other suitable in-cabin or outside locations. In some embodiments, the first image capture device 106 and the second image capture device 108 may be provided at physically separate locations, for example, on two separate tripods disposed about the scene 104.

In FIGS. 1 to 3, the first image capture device 106 includes a first image sensor 110, and the second image capture device 108 includes a second image sensor 112. The first image sensor 110 may include a sensor array made up of a first set of photosensitive pixels 114, and the second image sensor 112 may include a sensor array made up of a second set of photosensitive pixels 116. The pixels 114, 116 may be configured to detect electromagnetic radiation incident thereon and convert the detected radiation into electrical signals, for example, accumulated electrical charges, which may be processed to generate image data. Each one of the pixels 114, 116 may include a light-receiving surface and associated pixel circuitry for processing signals at the pixel level and communicating with other electronics, such as a readout unit. In general, each pixel 114, 116 may be individually addressed and read out. In some embodiments, the first image sensor 110 and the second image sensor 112 may each include hundreds of thousands or millions of pixels 114, 116, for example, from about 1080×1920 to about 6000×8000 pixels. However, many other sensor configurations with different pixel arrangements, aspect ratios, and fewer or more pixels are contemplated. Depending on the application, the pixels 114, 116 within each image sensor 110, 112 may or may not be all identical.

Referring still to FIGS. 1 to 3, the first image capture device 106 has a first field of view 118 of the scene 104 with a first optical axis 120, and the second image capture device 108 has a second field of view 122 of the scene with a second optical axis 124. The first image capture device 106 may include first imaging optics 126 disposed in front of the first image sensor 110 and defining the first field of view 118 and the first optical axis 120, and the second image capture device 108 may include second imaging optics 128 disposed in front of the second image sensor 112 and defining the second field of view 122 and the second optical axis 124. For example, the first imaging optics 126 and the second imaging optics 128 may each include a single lens or a plurality of lenses. The first field of view 118 is different from the second field of view 122 in order to provide the two different viewpoints and enable stereoscopic imaging. It is appreciated, however, that although the first and second fields of view 118, 122 are depicted in FIGS. 1 to 3 as having the same size and shape, this may not be the case in other embodiments.

Figure 4:
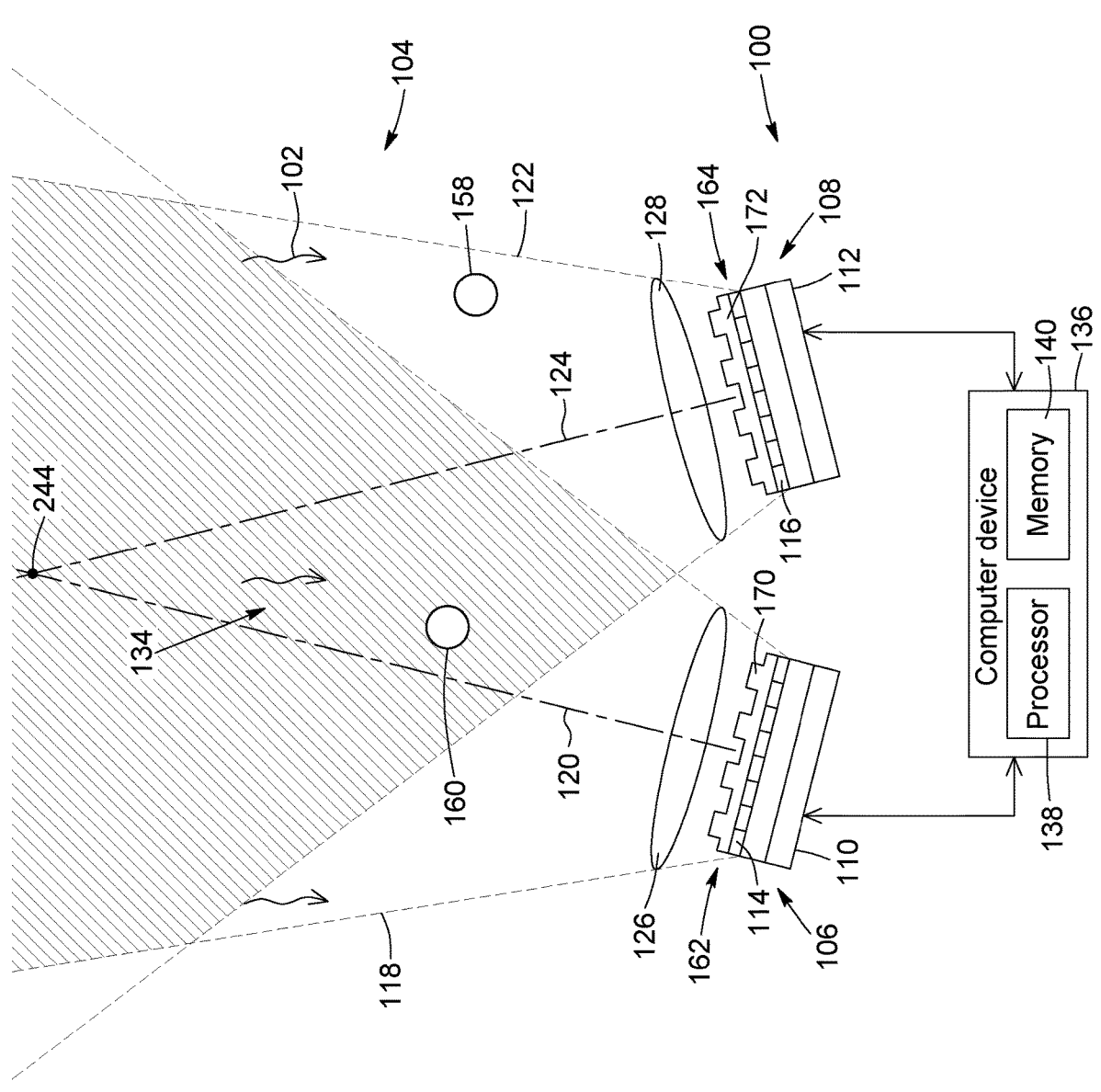
FIG. 4 is a schematic top plan view of an imaging system, in accordance with another embodiment.

In the illustrated embodiment, the first image capture device 106 and the second image capture device 108 are arranged along a line 130. In such a case, the first optical axis 120 and the second optical axis 124 are substantially parallel to each other and are separated one from the other by a stereoscopic baseline distance 132. In some embodiments, the stereoscopic baseline distance 132 may range from about 1 cm to about 5 m, although other stereoscopic baseline distance values may be used in other embodiments. In some embodiments, the first and second image capture devices 106, 108 may have different arrangements in terms of relative position and orientation. For example, the first optical axis 120 and the second optical axis 124 may not be parallel to each other and may therefore intersect at a point 244 in the scene 104, as depicted in the embodiment illustrated in FIG. 4. In some embodiments, the first optical axis 120 and the second optical axis 124 may intersect at a point in space located in the object focal plane of both the first image capture device 106 and the second image capture device 108. In such embodiments, the stereoscopic disparity, the first TDM disparity, and the second TDM disparity are all expected to be zero at the intersecting point, which can be advantageous in some applications, as described below.

The first field of view 118 and the second field of view 122 overlap over a stereoscopic overlap region 134 of the scene 104 (hatched region in FIGS. 1 to 3). The stereoscopic overlap region 134 defines the portion of the scene 104 for which stereoscopic imaging can be performed based on first and second image data acquired by the first and second image capture devices 106, 108. The size and shape of the stereoscopic overlap region 134 depend, inter alia, on the individual size and shape of the first and second fields of view 118, 122 and the relative arrangement of the first and second image capture devices 106, 108, including the stereoscopic baseline distance 132. It is appreciated that stereoscopic imaging cannot be performed in a blind-spot region at close range (e.g., closer to line 190 in FIG. 1). The axial extent of the stereoscopic blind-spot region (e.g., the distance between line 130 and line 190 in FIG. 1) is generally proportional to the stereoscopic baseline distance 132 and inversely proportional to the angular extent of the first and second fields of view 118, 122.

In some embodiments, the first image sensor 110 and the second image sensor 112 may each be a CMOS or a CCD image sensor, although other types of photodetector arrays (e.g., charge injection devices or photodiode arrays) may also be used. The first and second image sensors 110, 112 may operate according to a rolling or a global shutter readout scheme, and may be part of a stacked, backside, or frontside illumination sensor architecture. The first and second image sensors 110, 112 may each be implemented using various image sensor architectures and pixel array configurations. The first and second image sensors 110, 112 may each include various additional components, non-limiting examples of which can include, to name a few, microlenses, color filters, color filter isolation structures, light guides, pixel circuitry, and the like. The structure, configuration, and operation of such possible additional components are generally known in the art and need not be described in greater detail herein.

In some embodiments, the first image capture device 106 and the second image capture device 108 may be substantially identical to each other, apart from their physical location and, possibly, their orientation. However, in other embodiments, the first image capture device 106 and the second image capture device 108 may differ in one or more other respects. For example, the first image sensor 110 and the second image sensor 112 may differ in terms of their structure, configuration, or operation, or any combination thereof. As described in greater detail below, in some embodiments, either the first image capture device 106 or the second image capture device 108 may be configured to provide diffraction-grating-based depth imaging. In other embodiments, both the first image capture device 106 and the second image capture device 108 may be configured to provide diffraction-grating-based imaging, with the same or different operating and/or design parameters.

Referring still to FIGS. 1 to 3, the imaging system 100 also includes a computer device 136 operatively coupled to the first and second image capture devices 106, 108.

The computer device 136 may be configured to process first image data captured by the first image sensor 110 and second image data captured by the second image sensor 112. The first image data may include a first set of pixel responses and the second image data may include a second set of pixel responses. Depending on the application, the first and second image data may each be acquired as one or more still images or as a video stream.

The computer device 136 may be provided within one or more general purpose computers and/or within any other suitable devices, implemented in hardware, software, firmware, or any combination thereof, and connected to the components of the imaging system 100 via appropriate wired and/or wireless communication links and interfaces. The computer device 136 may be fully or partly integrated with the first image capture device 106, fully or partly integrated with the second image capture device 108, fully or partly distributed among the first and second image capture devices 106, 108, or physically separate from both the first and second image capture devices 106, 108. In some embodiments, the computer device 136 may include a distributed and/or cloud computing network. The computer device 136 may include a processor 138 and a memory 140.

The processor 138 may implement operating systems, and may be able to execute computer programs, also known as commands, instructions, functions, processes, software codes, executables, applications, and the like. While the processor 138 is depicted in FIGS. 1 to 3 as a single entity for illustrative purposes, the term "processor" should not be construed as being limited to a single processor, and accordingly, any known processor architecture may be used. In some embodiments, the processor 138 may include a plurality of processing units. Such processing units may be physically located within the same device, or the processor 138 may represent the processing functionalities of a plurality of devices operating in coordination. For example, the processor 138 may include or be part of one or more of a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and to operate collectively as a processor.

The memory 140, which may also be referred to as a "computer readable storage medium" is capable of storing computer programs and other data to be retrieved by the processor 138. The terms "computer readable storage medium" and "computer readable memory" refer herein to a non-transitory and tangible computer product that can store and communicate executable instructions for the implementation of various steps of the techniques disclosed herein. The computer readable storage medium 140 may be any computer data storage device or assembly of such devices, including a random-access memory (RAM); a dynamic RAM; a read-only memory (ROM); a magnetic storage device, such as a hard disk drive, a floppy disk, and a magnetic tape; an optical storage device, such as a compact disc (CD or CDROM), a digital video disc (DVD), and a Blu-Ray™ disc; a solid state drive; a flash drive memory; and/or any other non-transitory memory technologies. The computer readable storage medium 140 may be associated with, coupled to, or included in the processor 138, and the processor 138 may be configured to execute instructions contained in a computer program stored in the computer readable storage medium 140 so as to perform operations. In some embodiments, the operations may include adjustments, enhancements, and/or improvements to images captured by the first and second image capture devices 106, 108.

In some embodiments, a combination of the first image data obtained by the first image capture device 106 and the second image data obtained by the second image capture device 108 may be used to yield stereoscopic image information about the scene 104. In some embodiments, the stereoscopic image information may be used to provide a stereoscopic depth map or other depth perception information.

Referring still to FIGS. 1 to 3, the scene 104 may include an object 142 located in the stereoscopic overlap region 134 defined by the overlap between the first field of view 118 of the first image capture device 106 and the second field of view 122 of the second image capture device 108. The first image data acquired by the first image capture device 106 and the second image data acquired by the second image capture device 108 may each include image information about the object 142 in the scene 104. The first image data and the second image data may differ at least due to the first image capture device 106 and the second image capture device 108 having different physical locations and, thus, being configured to image the scene 104 from two different viewpoints.

Figure 5:
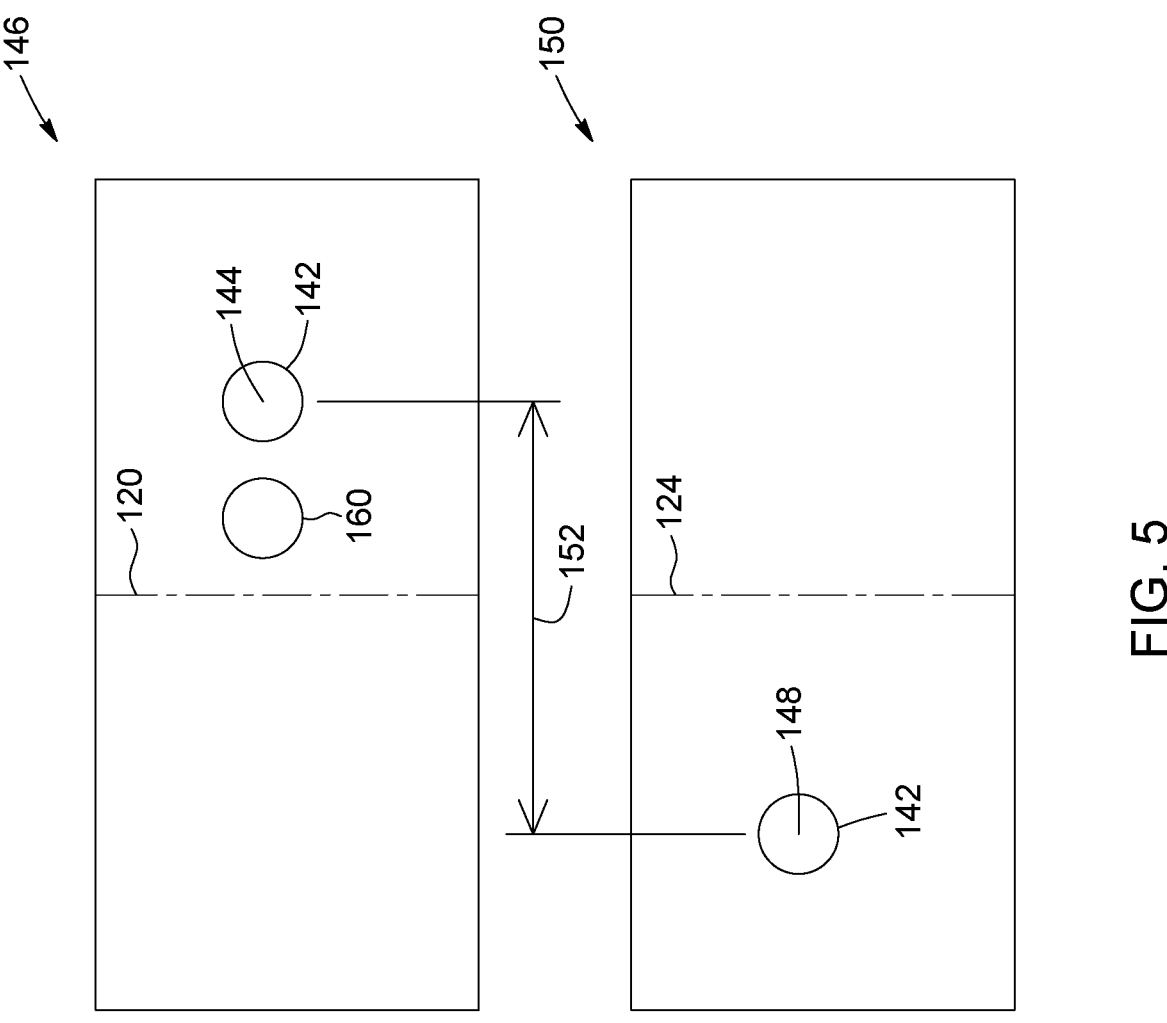
FIG. 5 is a schematic representation of a stereoscopic image pair including a first image and a second image having a stereoscopic disparity therebetween.

For example, as depicted in FIG. 5, the object 142 may have a first pixel location 144 in a first image 146 obtained from the first image data and a second pixel location 148 in a second image 150 obtained from the second image data, where the second pixel location 148 differs from the first pixel location 144. The combination of the first image 146 and the second image 150 may be referred to as a stereoscopic image pair. The distance or displacement between the first and second pixel locations 144, 148 of the object 142 in the first and second images 146, 150 when the two images 146, 150 are superimposed is referred to herein as the stereoscopic disparity 152 associated with the object 142. That is, the stereoscopic disparity 152 may be determined based on a comparison between the first and second images 146, 150 to identify therein matching pairs of corresponding image points, a problem which is known as the correspondence problem. The stereoscopic disparity 152 can provide relative depth information about an object 142 in the scene 104, that is, depth information not in absolute or real-world distance units. The stereoscopic disparity 152 is generally inversely related to the absolute or real-world or depth 154 of the object 142. For simplicity and explanatory purposes, only one object 142 is shown in both the first and second images 146, 150 depicted in FIG. 5. However, it is appreciated that the first and second image capture devices 106, 108 may be configured to view and image a variety of different or more complex scenes that may include any number of objects or features.

Returning to FIGS. 1 to 3, in some embodiments, the depth 154 of the object 142 may be determined by the computer device 136 based on the stereoscopic disparity 152 and the stereoscopic baseline distance 132. For example, in the illustrated embodiment, assuming that the first and second image capture devices 106, 108 have a same focal length, f, the depth 154 of the object 142, z, may be determined from the following relationship:

$$z = \frac{bf}{d_{stereo}}, \tag{1}$$

where b is the stereoscopic baseline distance 132 and the $d_{stereo}$ is the stereoscopic disparity 152. Thus, the depth of various features of the scene 104 may be determined from the stereoscopic disparity of corresponding image points. Features of the scene 104 located at different depths from the first and second image capture devices 106, 108 are expected to have different stereoscopic disparities. In the model of Equation (1), corresponding image features in the first and second images 146, 150 in FIG. 5 are assumed to lie along a same horizontal line. As such, the stereoscopic disparity $d_{stereo}$ in Equation (1) corresponds to a horizontal disparity. Several stereoscopic imaging methods assume zero vertical disparity, although this is not a requirement in the present techniques.

Referring still to FIGS. 1 to 3, the computer device 136 may be configured to control the first and second image capture devices 106, 108 to provide synchronization or time coordination between the image capture operation performed by the first image capture device 106 and the image capture operation performed by the second image capture device 108. In such embodiments, a pair of first and second images 146, 150 forming a stereoscopic image pair may be acquired at substantially the same time. In some embodiments, however, the images 146, 150 forming a stereoscopic image pair may not be acquired at substantially the same time, for example, in the case of a stationary scene. However, in such embodiments, the time delay between the image capture operation performed by the first image capture device 106 and the image capture operation performed by the second image capture device 108 may be determined or controlled to facilitate the stereoscopic processing of the first and second image data, for example, to compute a stereoscopic disparity or depth map.

It is appreciated that various techniques for stereoscopic matching and disparity estimation exist and may be used herein for computing depth from two sets of image data acquired from two different viewpoints. Depending on the application, such techniques may have various degrees of complexity and sophistication. It is also appreciated that the theory and applications of stereoscopic matching and depth mapping techniques are generally known in the art, and need not be described in detail herein other than to facilitate an understanding of the present disclosure.

Referring still to FIGS. 1 to 3, although conventional techniques for stereoscopic imaging and depth sensing have a number of advantages, they also have certain drawbacks and limitations. One limitation is that stereoscopic imaging may only be performed for portions of the scene 104, for example, the object 142, that are within the stereoscopic overlap region 134 defined by the overlapping fields of views 118, 122 of the first and second image capture devices 106, 108. This means that the depth of objects 156, 158 that are either within the field of view 118 of the first image capture device 106 or within the field of view 122 of the second image capture device 108, but that are outside the stereoscopic overlap region 134 may not be determined by stereoscopic imaging. This includes the blind-spot region at close range mentioned above. Another limitation is that stereoscopic imaging also requires that an object or feature disposed within the stereoscopic overlap region 134 be visible in both the image 146 acquired by the first image capture device 106 and the image 150 acquired by the second image capture device 108. This means that the depth of an object 160 that is disposed in the stereoscopic overlap region 134 but that is occluded by another object 142 so as to be visible in either the image 146 acquired by the first image capture device 106 or the image 150 acquired by the second image capture device 108, but not in both, may also not be determined by stereoscopic imaging.

In order to overcome or alleviate these limitations, the imaging system 100 illustrated in FIGS. 1 to 3 provides for 3D imaging and depth sensing in a dual or hybrid mode of stereoscopic imaging and diffraction-grating-based imaging, in order to leverage or benefit from advantages of both imaging techniques. For this purpose, the first image capture device 106 includes a first transmissive diffraction mask (TDM) 162 disposed over the first image sensor 110, and the second image capture device 108 includes a second TDM 164 disposed over the second image sensor 112. The first TDM 162 is configured to encode first TDM depth information about the scene 104 in the first image data captured by the first image capture device 106. In particular, the first TDM 162 is configured to diffract a first portion of the received light 102 to generate a first diffracted light or wavefront 166 encoding therein, as the first TDM depth information, information about the angle of incidence of the first portion of the received light 102. The first diffracted light or wavefront 166 is detected as a set of first pixel responses by the pixels 114 of the first image sensor 110. The second TDM 164 is configured to encode second TDM depth information about the scene 104 in the second image data captured by the second image capture device 108. In particular, the second TDM 164 is configured to diffract a second portion of the received light 102 into a second diffracted light or wavefront 168 encoding therein, as the second TDM-based information, information about the angle of incidence of the second portion of the received light 102. The second diffracted wavefront 168 is detected as a set of second pixel responses by the pixels 116 of the second image sensor 112.

The provision of the first and second TDMs 162, 164 in front of the first and second image sensors 110, 112 can impart each of the first and second image capture devices 106, 108 with standalone monoscopic 3D imaging capabilities, including depth sensing capabilities, within its individual field of view 118, 122. This is because the first and second TDMs 162, 164 are each configured to diffract the portion of the received light 102 incident thereon into corresponding diffracted light 166, 168 having an intensity pattern that is spatially modulated in accordance with the angle of incidence of the received light 102. The underlying image sensors 110, 112 are each configured to sample, on a per-pixel basis, the intensity pattern of the corresponding diffracted light 166, 168 in the near-field to provide image data conveying information indicative of the angle of incidence of the corresponding portion of the received light 102. The image data may be used or processed in a variety of ways to provide multiple functions including, but not limited to, 3D depth map extraction, 3D surface reconstruction, image refocusing, and the like. Thus, in the imaging system 100 illustrated in the embodiment of FIGS. 1 to 3, the TDM-equipped first image capture device 106 and the TDM-equipped second image capture device 108 may be used, alone, as standalone monoscopic depth sensors, and in combination, as a TDM-supplemented stereoscopic depth sensor.

The structure, configuration, and operation of imaging devices using transmissive diffraction grating structures in front of 2D image sensors to provide 3D imaging capabilities are described in co-assigned international patent applications PCT/CA2017/050686 (published as WO 2017/210781), PCT/CA2018/051554 (published as WO 2019/109182), and PCT/CA2020/050760 (published as WO 2020/243828), as well as in the following master's thesis: Kunnath, Neeth, Depth from Defocus Using Angle Sensitive Pixels Based on a Transmissive Diffraction Mask (Master's thesis, McGill University Libraries, 2018). The contents of these four documents are incorporated herein by reference in their entirety. It is appreciated that the theory and applications of such diffraction-based 3D imaging devices are generally known in the art, and need not be described in detail herein other than to facilitate an understanding of the present techniques.

Referring still to FIGS. 1 to 3, the TDMs 162, 164 each include at least one diffraction grating 170, 172. Each diffraction grating 170, 172 may be characterized by a grating axis 174, 176 and a grating profile having a grating period along the grating axis 174, 176. In the illustrated embodiment, each TDMs 162, 164 includes a single diffraction grating 170, 172. However, TDMs including more than one diffraction grating may be used in other embodiments.

The term "diffraction grating", or simply "grating", refers herein to a structure or material having a spatially modulated optical property and which is configured to spatially modulate the amplitude and/or the phase of an optical wavefront incident thereon. The spatially modulated optical property, for example, a refractive index modulation pattern, defines a grating profile. In some embodiments, a diffraction grating may include a periodic arrangement of diffracting elements, for example, alternating ridges and grooves, whose spatial period, the grating period, is substantially equal to or longer than the center wavelength of the optical wavefront incident thereon. Diffraction gratings may also be classified as "amplitude gratings" or "phase gratings", depending on the nature of the diffracting elements. In amplitude gratings, the perturbations to the incident wavefront caused by the grating are the result of a direct amplitude modulation, while in phase gratings, these perturbations are the result of a modulation of the relative group velocity of light caused by a spatial variation of the refractive index of the grating structure or material. In several embodiments disclosed in the present description, the diffraction gratings are phase gratings, which generally absorb less light than amplitude gratings, although amplitude gratings may be used in other embodiments. In general, a diffraction grating is spectrally dispersive, if only slightly, so that different wavelengths of an incident optical wavefront may be diffracted differently. However, diffraction gratings exhibiting a substantially achromatic response over a certain operating spectral range exist and can be used in some embodiments.

Referring still to FIGS. 1 to 3, the first and second diffraction gratings 170, 172 are both transmission phase gratings, specifically binary phase gratings whose grating profile is a two-level, square-wave function. Each diffraction grating 170, 172 has a grating profile along the grating axis 174, 176 including a series of ridges 178, 180 periodically spaced-apart at the grating period, interleaved with a series of grooves 182, 184 also periodically spaced-apart at the grating period. In such a case, the grating period corresponds to the sum of the width, along the grating axis 174, 176, of one ridge 178, 180 and one adjacent groove 182, 184. Each diffraction grating 170, 172 may also be characterized by a duty cycle, defined as the ratio of the ridge width to the grating period, and by a step height, defined as the difference in level between the ridges 178, 180 and the grooves 182, 184. The step height may provide a predetermined optical path difference between the ridges 178, 180 and the grooves 182, 184.

In the illustrated embodiment, the first diffraction grating 170 and the second diffraction grating 172 have parallel grating axes 174, 176 and identical grating profiles, including identical grating periods. However, this need not be the case in other embodiments, where the first and second TDMs 162, 164 may differ from each other in one or more respects. In some embodiments, the first and second grating periods may each range between about 0.1 μm and about 20 μm, and the first and second step heights each range between about 0.1 μm and about 1 μm, although values outside these ranges can be used in other embodiments. In the illustrated embodiment, the first and second diffraction gratings 170, 172 both have a duty cycle equal to 50%, but duty cycle values different from 50% may be used in other embodiments. Depending on the application, the grooves 182, 184 may be empty or filled with a material having a refractive index different from that of the ridge material.

In the illustrated embodiment, the grating period of the first diffraction grating 170 is twice as large as the pixel pitch of the first image sensor 110, and the grating period of the second diffraction grating 172 is twice as large as the pixel pitch of the second image sensor 112. However, other grating-period-to-pixel-pitch ratios, R, may be used in other embodiments. Non-limiting examples of possible ratio values include, to name a few, $R \geq 2$; $R=(n+1)$, where n is a positive integer; $R=2n$, where n is a positive integer; $R=1$; $R=2/(2n+1)$, where n is a positive integer, for example, $n=1$ or 2; and $R=n/m$, where n and m are positive integers larger than two and $m>n$, for example, $n=3$ and $m=4$. The term "pixel pitch" refers herein to the center-to-center distance between nearest-neighbor pixels. In some embodiments, the first and second image sensors 110, 112 may each have a pixel pitch ranging between about 0.7 lam and about 10 lam, although other pixel pitch values may be used in other embodiments.

Referring still to FIGS. 1 to 3, the first diffraction grating 170 is disposed over the first image sensor 110 such that the center of each ridge 178 is vertically aligned with the midpoint between adjacent pixels 114, and likewise for the center of each groove 182. Similarly, the second diffraction grating 172 is disposed over the second image sensor 112 such that the center of each ridge 180 is vertically aligned with the midpoint between adjacent pixels 116, and likewise for the center of each groove 184. It is appreciated that different configurations are possible in other embodiments. For example, the degree of vertical alignment between each one of the TDMs 162, 164 and the corresponding one of the image sensors 110, 112 may be adjusted in accordance with a chief ray angle (CRA) characteristic associated with the corresponding one of the image capture devices 106, 108. In such a case, the vertical alignment between the first diffraction grating 170 and the first set of pixels 114 and the vertical alignment between the second diffraction grating 172 and the second set of pixels 116 may each change as function of position, for example, as one goes from the center to the edge of the corresponding image sensor 110, 112. This means, for example, that depending on its position within the image sensor 110, 112, a given pixel 114, 116 may be vertically aligned with a center of a ridge 178, 180, a center of a groove 182, 184, a transition between a ridge 178, 180 and a groove 182, 184, or some intermediate position of the corresponding overlying diffraction grating 170, 172.

The computer device 136 is operatively coupled to the first and second image sensors 110, 112 to receive therefrom the first and second sets of pixel responses, respectively. The computer device 136 may be configured to determine, from the first and second sets of pixel responses, angle-of-incidence data conveying the angle of incidence of the received light 102. The computer device 136 may also be configured to determine first and second TDM depth information about the scene 104, for example, a depth map, based on the angle-of-incidence information.

In some embodiments, the first and second image capture devices 106, 108 may be implemented by adding or coupling the first and second TDMs 162, 164 on top of the first and second image sensors 110, 112, respectively. In such embodiments, the first and second image sensors 110, 112 may be conventional CMOS or CCD imagers. However, in other embodiments, either or both of the first and second image capture devices 106, 108 may be implemented and integrally packaged as a separate, dedicated, and/or custom-designed device incorporating therein all or most of its components, including a TDM and an image sensor.

Figures 6A, 6B, 6C:
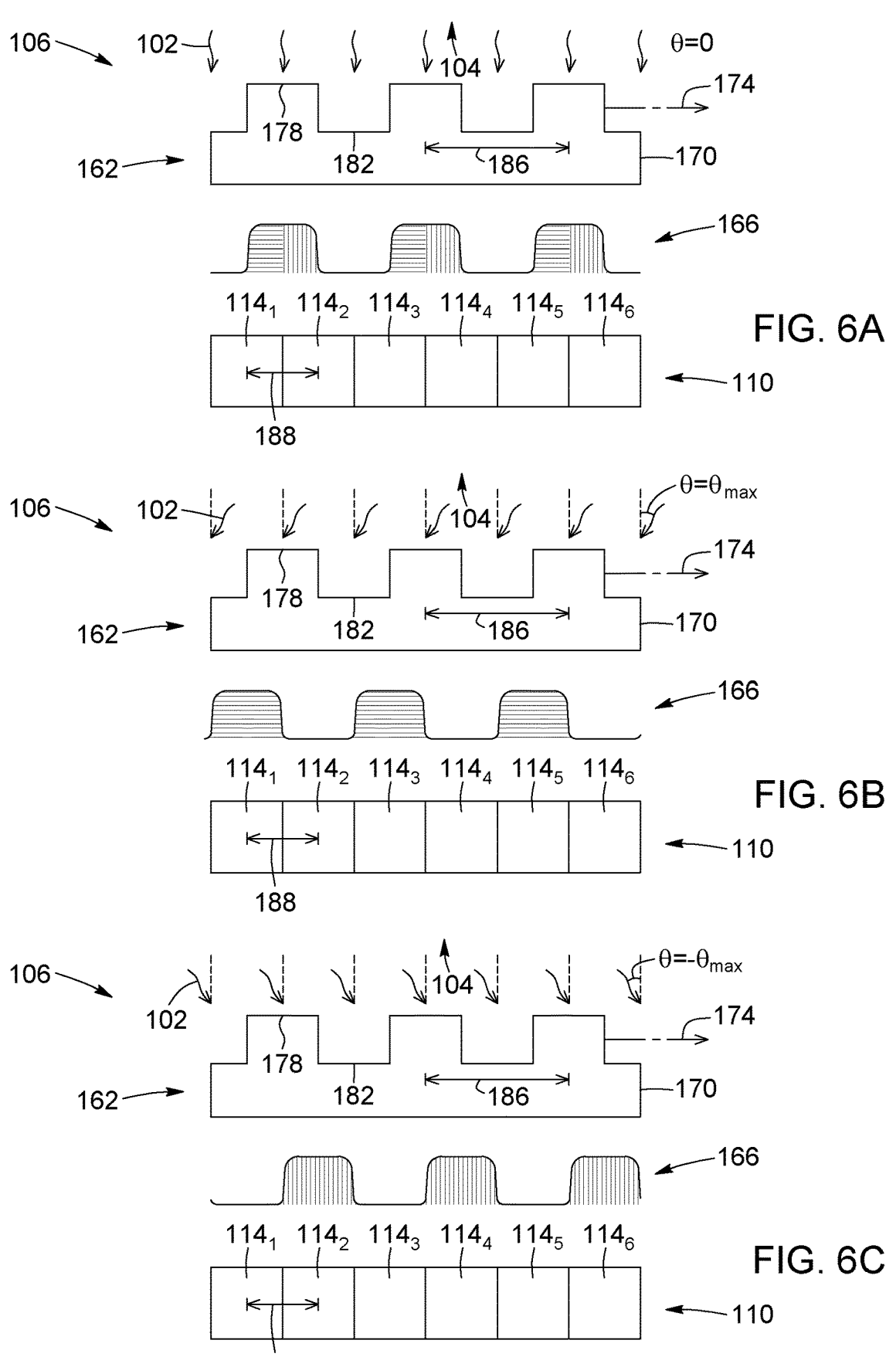
FIGS. 6A to 6C are schematic representations of an example of an imaging system including a transmissive diffractive mask and receiving light with three different angles of incidence θ: normal incidence, θ=0 (FIG. 6A); oblique incidence, $\theta=\theta_{max}>0$ (FIG. 6B); and oblique incidence, $\theta=-\theta_{max}<0$ (FIG. 6C).

Referring to FIGS. 6A to 6C, the operation of TDM-based imaging systems and how they can be used to provide depth sensing capabilities will be described in greater detail. FIGS. 6A to 6C are schematic representations of an example of an image capture device 106 receiving light 102 with three different angles of incidence θ from an observable scene 104 (FIG. 6A: normal incidence, $\theta=0$; FIG. 6B: oblique incidence, $\theta=\theta_{max}>0$; and FIG. 6C: oblique incidence, $\theta=-\theta_{max}<0$). The image capture device 106 includes a TDM 162 and an image sensor 110 disposed under the TDM 162. The TDM 162 includes a binary phase diffraction grating 170 having a grating axis 174 and a grating profile having a grating period 186 and including alternating ridges 178 and grooves 182 with a duty cycle of 50%. The image sensor 110 includes a set of pixels $114_1$-$114_6$. The diffraction grating 170 is disposed over the pixels $114_1$-$114_6$ such that the center of each ridge 178 is vertically aligned with the midpoint between adjacent ones of the pixels $114_1$-$114_6$, and likewise for the center of each groove 182. The grating period 186 is twice as large as the pixel pitch 188.

In operation of the image capture device 106, the diffraction grating 170 receives the light 102 from the scene 104 on its input side, and diffracts the received light 102 to generate, on its output side, a diffracted wavefront 166 that propagates toward the image sensor 110 for detection by the pixels $114_1$-$114_6$. The diffracted wavefront 166 has an intensity pattern that is spatially modulated based, inter alia, on the geometrical and optical properties of the diffraction grating 170, the angle of incidence θ of the received light 102, and the position of the observation plane (e.g., the image sensor 110, or an intermediate optical component, such as a microlens array, configured to relay the diffracted wavefront 166 onto the image sensor 110). In the example illustrated in FIGS. 6A to 6C, the observation plane corresponds to the light-receiving surface of the image sensor 110.

The TDM 162 and the image sensor 110 may be disposed relative to each other such that the light-receiving surface of the image sensor 110 is positioned in the near-field diffraction region of the diffraction grating 170. For example, in order to detect the diffracted wavefront 166 in the near-field, the separation distance between the grating profile of the diffraction grating 170, where the diffracted wavefront 166 is formed, and the light-receiving surface of the image sensor 110, where the diffracted wavefront 166 is detected, may range between about 0.2 μm and about 20 μm, such as between about 0.5 μm and about 8 μm if the center wavelength of the received light 102 is in the visible range.

The Talbot effect is a near-field diffraction effect in which plane waves incident on a periodic structure, such as a diffraction grating, produce self-images of the periodic structure at regular distances behind the periodic structure. The self-images can be referred to as Talbot images. The main distance at which self-images of the periodic structure are observed due to interference is called the Talbot length $z_T$. In the case of a diffraction grating having a grating period g, the Talbot length $z_T$ may be expressed as follows: $z_T=\lambda/[1-(1-\lambda^2/g^2)^{1/2}]$, where λ is the wavelength of the light incident on the grating. This expression simplifies to $z_T=2g^2/\lambda$ when g is sufficiently large compared to λ. Other self-images are observed at integer multiples of the half Talbot length, that is, at $nz_T/2$. These additional self-images are either in-phase and out-of-phase by half of the grating period with respect to the self-image observed at $z_T$, depending on whether n is even or odd, respectively. Further sub-images with smaller periods can also be observed at smaller fractional values of the Talbot length. These self-images are observed in the case of amplitude gratings. In the case of phase gratings, such as the one depicted in FIGS. 6A to 6C, it is the phase of the grating that is self-imaged at integer multiples of the half-Talbot length, which cannot be observed using intensity-sensitive photodetectors, such as photodiodes. As such, a phase grating, unlike an amplitude grating, produces a diffracted wavefront of substantially constant light intensity in an observation plane located at integer multiples of the half-Talbot length. However, phase gratings may also be used to generate near-field intensity patterns similar to Talbot self-images at intermediate observation planes that are shifted from the planes located at integer multiples of the half-Talbot length. For example, such intermediate observation planes may be located at $z_T/4$ and $3z_T/4$. These intensity patterns, which are sometimes referred to as Lohmann images, can be detected with intensity-sensitive photodetectors.

In the example illustrated in FIGS. 6A to 6C, the diffraction grating 170 and the image sensor 110 are positioned relative to each other so as to detect these Talbot-like, near-field intensity patterns formed at observation planes corresponding to non-integer multiples of the half-Talbot distance (i.e., Lohman images), for example, at $z_T/4$ or $3z_T/4$. In such a case, the diffraction grating 170 is configured to generate, in the observation plane, a diffracted wavefront 166 having an intensity pattern that is spatially modulated according to the grating period 186. As depicted in FIGS. 6A to 6C, the intensity pattern of the diffracted wavefront 166 has a spatial period that matches or relates to the grating period 186 and a shape that matches or relates to the grating profile of the diffraction grating 170. In FIGS. 6A to 6C, the spatial period of the intensity pattern of the diffracted wavefront 166 is substantially equal to the grating period 186. However, in other embodiments, the spatial period of the intensity pattern of the diffracted wavefront 166 may be a rational fraction of the grating period 186, such as half of the grating period 186 in the case of doubled Lohmann images. Each of the pixels $114_1$-$114_6$ of the image sensor 110 is configured to sample a respective portion of the intensity pattern of the diffracted wavefront 166 and to generate therefrom a corresponding intensity-based pixel response. In FIGS. 6A to 6C, the horizontally hatched portions of the intensity pattern of the diffracted wavefront 166 are sampled by the odd pixels $114_1$, $114_3$, $114_5$, while the vertically hatched portions are sampled by the even pixels $114_2$, $114_4$, $114_6$.

Another property of Lohmann self-images is that they shift laterally along the grating axis 174 upon varying the angle of incidence $\theta$ of the received light 102, while substantially retaining their period and shape. This can be seen from a comparison between the intensity pattern of the diffracted wavefronts 166 illustrated in FIGS. 6A to 6C. The diffraction grating 170 is configured to impart an asymmetric angle-dependent spatial modulation to the intensity pattern of the diffracted wavefront 166, which is sampled by the pixels $114_1$-$114_6$. By controlling the vertical alignment between the diffraction grating 170 and the image sensor 110 and the relationship between the grating period 186 and the pixel pitch 188, the intensities measured by the individual pixels $114_1$-$114_6$ for a given intensity of the received light 102 will vary as a function of the angle of incidence $\theta$ due to the lateral shifts experienced by the diffracted wavefront 166. For example, in FIGS. 6A to 6C, the intensities measured by the odd pixels $114_1$, $114_3$, $114_5$ are respectively equal to (FIG. 6A), greater than (FIG. 6B), and less than (FIG. 6C) the intensities measured by the even pixels $114_2$, $114_4$, $114_6$. The angle-dependent information encoded by the diffraction grating 170 into the intensity pattern of the diffracted wavefront 166 recorded by the image sensor 110 as a set of individual intensity-based pixel responses may be extracted or decoded to provide depth information about the scene 104.

Figure 7:
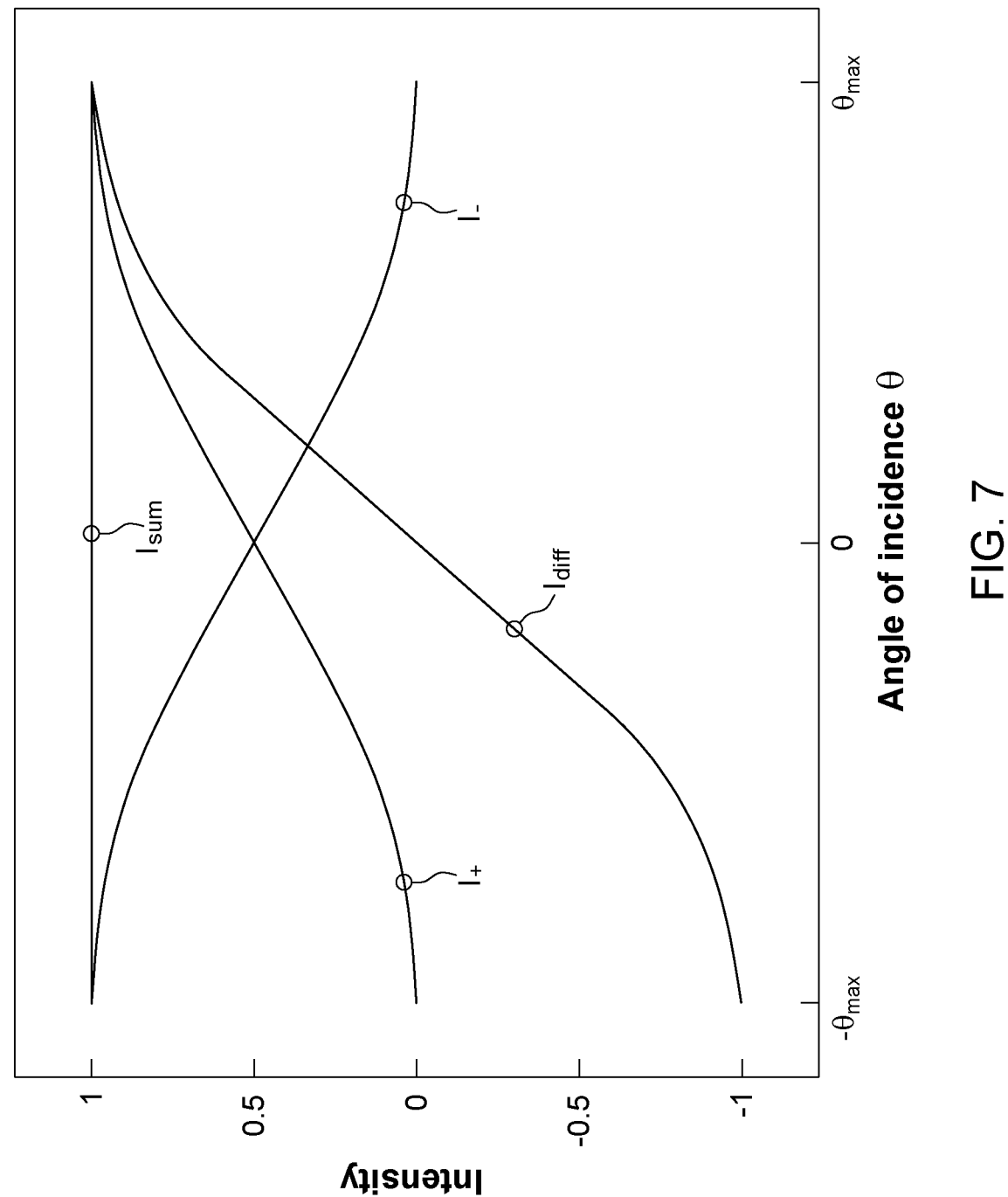
FIG. 7 is a graph depicting curves of the individual pixel responses of the odd pixels ($I_+$) and the even pixels ($I_-$) of the imaging system illustrated in FIGS. 6A to 6C, plotted as functions of the angle of incidence θ, for a given intensity of incident light.

Referring to FIG. 7, there are depicted curves of the individual pixel responses of the odd pixels $114_1$, $114_3$, $114_5$ ($I_+$) and the even pixels $114_2$, $114_4$, $114_6$ ($I_-$) of FIGS. 6A to 6C plotted as functions of the angle of incidence $\theta$, for a given intensity of incident light. FIG. 7 assumes that the intensity of the incident light is equal to one and that there is a modulation depth of substantially 100% between $\theta=\pm\theta_{max}$, where the maxima of the diffracted intensity pattern are centered on either the odd pixels $114_1$, $114_3$, $114_5$ or the even pixels $114_2$, $114_4$, $114_6$ (peak modulated level), and $\theta=0$, where the maxima of the diffracted intensity pattern are centered on the transitions between the odd pixels $114_1$, $114_3$, $114_5$ and the even pixels $114_2$, $114_4$, $114_6$ (unmodulated level). It is seen that $I_+$ and have complementary asymmetrical angular responses, where $I_-(\theta)=I_+(-\theta)$ and where $I_+$ and respectively increases and decreases as $\theta$ increases.

FIG. 7 also depicts curves of the sum $I_{sum}=I_++I_-$ and the difference $I_{diff}=I_+-I_-$ of the odd and even pixel responses as functions of $\theta$. It is appreciated that since the intensities $I_+$ and $I_-$ vary in a complementary way as a function of $\theta$, their sum $I_{sum}$ remains, in principle, independent of $\theta$. In practice, $I_{sum}$ can be controlled to remain largely independent of $\theta$, or at least symmetrical with respect to $\theta$ (i.e., so that $I_{sum}(\theta)$ $=I_{sum}(-\theta)$. The summed pixel response, $I_{sum}$, is similar to the signal that would be obtained by the pixels $114_1$-$114_6$ in the absence of the diffraction grating 170, and thus can provide 2D intensity image information, with no or little angle-dependent information encoded therein. The differential pixel response, $I_{diff}$, varies asymmetrically as a function of $\theta$ and represents a measurement of the angle-of-incidence information encoded into the diffracted wavefront 166 by the diffraction grating 170. The pixel responses $I_+$, $I_-$, $I_{sum}$, and $I_{diff}$ may be expressed mathematically as follows:

$$I_{\pm}(\theta) = \frac{I_0}{2}[1 \pm m\sin(\beta\theta)], \qquad (2)$$

$$I_{sum} = I_0, \qquad (3)$$

$$I_{diff}(\theta) = I_0 m\sin(\beta\theta), \qquad (4)$$

where $I_0$ is the intensity of the incident light, m is a modulation depth parameter, and $\beta$ is an angular sensitivity parameter. It is noted that m=1 and $\beta=1/\theta_{max}$ in FIG. 7. It is also noted that the expressions for the intensity-based pixel responses $I_+$ and $I_-$ in Equation (2) are not exact relationships. However, they can provide convenient analytical expressions that are adequately representative of how $I_+$ and $I_-$ may vary as a function of the angle of incidence.

Equations (3) and (4) imply that each summed pixel response $I_{sum}$ is obtained by summing one odd pixel response $I_+$ and one even pixel response $I_-$, and that each differential pixel response $I_{diff}$ is obtained by subtracting one odd pixel response $I_+$ from one even pixel response $I_-$. Such an approach may be viewed as a 2×1 binning mode. However, other approaches can be used to determine summed and differential pixel responses $I_{sum}$ and $I_{diff}$, for example, a 2×2 binning mode or a convolution mode (e.g., using a kernel such that $I_{sum}$ and $I_{diff}$ have the same pixel resolution as $I_+$ and $I_-$). In this regard, the term "differential" is used herein to denote not only a simple subtraction between two pixel responses, but also a more complex differential operation from which a difference between two or more pixel responses is obtained. Furthermore, although the example of FIGS. 6A to 6C defines two groups of pixels 114 with different pixel responses as a function of the angle of incidence (i.e., the odd pixels $114_1$, $114_3$, $114_5$ and the even pixels $114_2$, $114_4$, $114_6$), other embodiments may define groups composed of more than two pixels with different angular responses.

The summed and differential pixel responses, $I_{sum}$ and $I_{diff}$, may be processed to provide TDM-based information about a scene. In some embodiments, the summed and differential pixel responses $I_{sum}$ and $I_{diff}$ may be used to define a TDM disparity, $d_{TDM}$, which is representative of the difference between the viewpoint of the scene 104 provided by the odd pixels $114_1$, $114_3$, $114_5$ and the viewpoint of the scene 104 provided by the even pixels $114_2$, $114_4$, $114_6$. Stated otherwise, the odd pixel responses $I_+$ and the even pixel responses $I_-$ obtained with the same image capture device 106 can provide two slightly different views of the scene 104, separated by an effective baseline distance, referred to herein as the TDM baseline distance $b_{TDM}$. The TDM baseline distance $b_{TDM}$ can depend, inter alia, on the modulation depth parameter m and the numerical aperture of the imaging optics (e.g., the lens diameter). It is appreciated that the TDM baseline distance $b_{TDM}$ can be significantly smaller than the stereoscopic baseline distance 132. The set of TDM disparities $d_{TDM}$ obtained from all of the odd-even pixel pairs ($I_+$, $I_-$) can be used to generate a TDM disparity map. The TDM disparity map can provide relative depth information about objects in a scene, that is, depth information about how far objects are relative to one another, but about how far objects are in terms or absolute or real-world distance units.

The TDM disparity map can be processed to generate an absolute TDM depth map of the scene 104. For example, in some embodiments, the absolute depth, $z_{TDM}$, of an object in the scene 104 can be related to the TDM disparity $d_{TDM}$ as follows:

$$d_{TDM} = S_{TDM}\left(\frac{1}{z_{TDM}} - \frac{1}{z_f}\right), \quad (5)$$

where $S_{TDM}$ is a depth sensitivity parameter associated with the TDM 162, and $z_f$ is the focus distance of the imaging system 100, that is, the distance of the object plane that is imaged in-focus by the imaging system 100.

Returning to FIGS. 1 to 3, the set of pixels 114 of the first image sensor 110 can be said to include a first odd pixels $114_O$ and first even pixels $114_E$, which are configured to sample complementary portions of the first diffracted light 166 over a full period thereof. The pixel responses of the first odd pixels $114_O$, $I_{1+}$, and the pixel responses of the first even pixels $114_E$, $I_{1-}$, may be described by Equation (2) and may be used to compute a set of first summed pixel responses, $I_{1,sum}$, for example, using Equation (3), and to compute a set of first differential pixel responses, $I_{1,diff}$, for example using Equation (4). The computer device 136 may be configured to determine first TDM depth information about the scene 104 from the set of first summed pixel responses $I_{1,sum}$ and the set of first differential pixel responses $I_{1,diff}$, for example, by computing a first set of TDM disparities $d_{TDM,1}$ and obtaining therefrom a first TDM disparity map.

Similarly, the set of pixels 116 of the second image sensor 112 can be said to include second odd pixels $116_O$ and second even pixels $116_E$, which are configured to sample complementary portions of the second diffracted light 168 over a full period thereof. The pixel responses of the second odd pixel $116_O$, $I_{2+}$, and the pixel responses of the second even pixels $116_E$, $I_{2-}$, may be described by Equation (2) and may be used to compute a set of second summed pixel responses, $I_{2,sum}$, for example, using Equation (3), and to compute a set of second differential pixel responses, $I_{2,diff}$, for example using Equation (4). The computer device 136 may be configured to determine second TDM depth information about the scene 104 from the set of second summed pixel responses $I_{2,sum}$ and the set of second differential pixel responses $I_{2,diff}$, for example, by computing a second set of TDM disparities $d_{TDM,2}$ and obtaining therefrom a second TDM disparity map.

Referring still to FIGS. 1 to 3, the computer device 136 is configured to process the first image data received from the first image capture device 106 and the second image data from the second image capture device 108. The first image data is associated with a region of the scene 104 contained within the field of view 118 of the first image capture device 106, and the second image data is associated with a region of the scene 104 contained with the field of view 122 of the second image capture device 108. The first image data can include first monoscopic TDM-based 3D image data, for example, a first TDM disparity or depth map obtained from $I_{1,diff}$ and $I_{1,sum}$. The second image data can include second monoscopic TDM-based 3D image data, for example, a second TDM disparity or depth map obtained from $I_{2,diff}$ and $I_{2,sum}$. The portion of the first and second image data associated with the stereoscopic overlap region 134 may also be combined or otherwise processed to obtain stereoscopic 3D image data, for example, a stereoscopic disparity or depth map. In some embodiments, the portion of the first image data and the portion of the second image data that are used in obtaining the stereoscopic 3D image data may be the first and second set of summed pixel responses $I_{1,sum}$ and $I_{2,sum}$. As noted above, the summed pixel responses $I_{1,sum}$ and $I_{2,sum}$ can provide 2D intensity image information about the stereoscopic overlap region 134 of the scene 104, which may be suitable for performing stereoscopic imaging. However, it is appreciated that any appropriate combination of the components of the first image data (e.g., $I_{1+}$, $I_{1-}$, $I_{1,sum}$, $I_{1,diff}$, and any combination thereof) captured by the first image capture device 106 and any appropriate combination of the components of the second image data (e.g., $I_{2+}$, $I_{2-}$, $I_{2,sum}$, $I_{2,diff}$, and any combination thereof) captured by the second image capture device 108 may be used to obtain stereoscopic 3D image data, including stereoscopic depth information.

In some embodiments, the computer device 136 may be configured to process the first TDM depth information, the second TDM depth information, and the stereoscopic depth information to provide combined, fused, or enhanced depth information about the scene 104.

It is appreciated that the first TDM depth information may be used to provide, alone, depth information associated with regions of the scene 104 that are visible in the field of view 118 of the first image capture device 106, but are outside the stereoscopic overlap region 134. It is also appreciated that the second TDM depth information may be used to provide, alone, depth information associated with regions of the scene 104 that visible in the field of view 122 of the second image capture device 108, but are outside the stereoscopic overlap region 134. For example, referring to FIGS. 1 to 3, the depth of object 156 would be determined based on the first TDM depth information, while the depth of object 158 would be determined based on the second TDM depth information. In some embodiments, the first and second TDM depth information can be used to determine the depth of objects at closer range (e.g., closer to line 190 in FIG. 1), where estimating depth stereoscopically is not possible. In some embodiments, this may be advantageous because TDM-based depth determination is generally more accurate at closer range. In other embodiments, TDM-based stereoscopic systems can be configured to provide a first depth range where TDM-based depth determination is more accurate and a second depth range, different from and complementary to the first depth range, where stereoscopic-based depth determination is more accurate.

In some embodiments, a combination of the first TDM depth information, the second TDM depth information, and the stereoscopic depth information may be used to provide depth information associated with features of the scene 104 inside the stereoscopic overlap region 134. Depending on the application, a variety of image processing techniques and algorithms may be used to combine, merge, fuse, or otherwise process the first TDM depth information, the second TDM depth information, and the stereoscopic depth information into combined or enhanced depth information. In some embodiments, the combination may be a weighted combination, where the weights are assigned on a per-pixel basis based on one or more quality or confidence criteria associated with the different sources of depth information. Non-limiting examples of possible criteria that can be used to assess the quality of or confidence in TDM depth information include, to name a few, object distance, object position in the field of view, contrast level, color content, edge angle, noise level, spatial frequency, object orientation with respect to a first and second TDM baseline orientation associated with the first and second TDM depth information, and object occlusion/visibility parameter. Non-limiting examples of possible criteria that can be used to assess the quality of or confidence in stereoscopic depth information include, to name a few, object distance, object position in the field of view, left-right consistency check, uniqueness constraint, blur level object orientation with respect to a stereoscopic baseline orientation associated with the stereoscopic depth information, and object occlusion/visibility parameter.

Referring still to FIGS. 1 to 3, when an object or feature of the scene 104 in the stereoscopic overlap region 134 is occluded in the image data acquired by one of the image capture devices 106, 108, the depth of that object or feature can be determined solely from the TDM depth information associated with the other one of the image capture. This is the case for object 160 in FIGS. 1 to 3, whose depth would be determined from the first TDM depth information alone. In such a case, the second TDM depth information and the stereoscopic depth information would be attributed a quality or confidence level or weight of zero. In some applications, the size of occluded regions and the number of occluded objects tend to increase as the stereoscopic baseline distance increases, which is one practical factor that puts an upper bound on the stereoscopic baseline distance. Solving the occlusion problem with using TDM depth information can allows the stereoscopic baseline distance to be increased, which in turn can increase the accuracy and range of the stereoscopic depth map.

In some embodiments, the first TDM depth information, the second TDM depth information, and the stereoscopic depth information may be weighted based on object distance, within an imaging distance range of the imaging system. For example, the stereoscopic depth information may be attributed a greater confidence weight than the first and second TDM depth information at farther range, and a lesser confidence weight than the first and second TDM depth information at closer range. This weighing approach reflects the assumption that, often, stereoscopic depth information is expected to be more accurate or reliable than TDM depth information at farther distances (e.g., due to the larger baseline distance), and less accurate at closer distances (e.g., due to increased blurring or to the stereoscopic perspectives being too different from each other). In such cases, the first and second TDM depth information may be complementary to the stereoscopic depth information to provide depth determination capabilities over a larger region of a scene.

In some embodiments, the first TDM depth information, the second TDM depth information, and the stereoscopic depth information may be weighted based on the position of the object in the first and second fields of view 118, 122. For example, returning briefly to FIG. 4, the first TDM depth information associated with object 160 may be attributed a greater confidence weight than the second TDM depth information and the stereoscopic depth information because object 160 is closer to first optical axis 120 that it is to the second optical axis 124. This weight attribution reflects the assumption that, often, the stereoscopic depth information and the TDM depth information are expected to be more accurate or reliable at the center of the field of view, and less accurate or reliable away from the center of the field of view (e.g., due to decrease of sensitivity of the TDM depth information, or an increase of lens distortion detrimental for the stereoscopic depth information). Thus, in such cases, the first or second TDM depth information may be complementary to the stereoscopic depth information to provide better depth estimations over the whole field of view. In particular, the benefit of this approach would be greater if the first imaging optics 126 and/or the second imaging optics 128 are wide field of view lenses, where distortion can be significant.

In the embodiment illustrated in FIGS. 1 to 3, the grating axes 174, 176 of the first and second diffraction gratings 170, 172 are horizontal, and so are the TDM baselines associated with their respective TDM disparity maps (see, e.g., FIG. 3). Thus, in such a configuration, the TDM baselines are parallel to the stereoscopic baseline between the first image capture device 106 and the second image capture device 108. This means that both the stereoscopic image data and the TDM image data are expected to provide better depth estimates for vertically oriented features than for horizontally oriented features.

Figure 8:
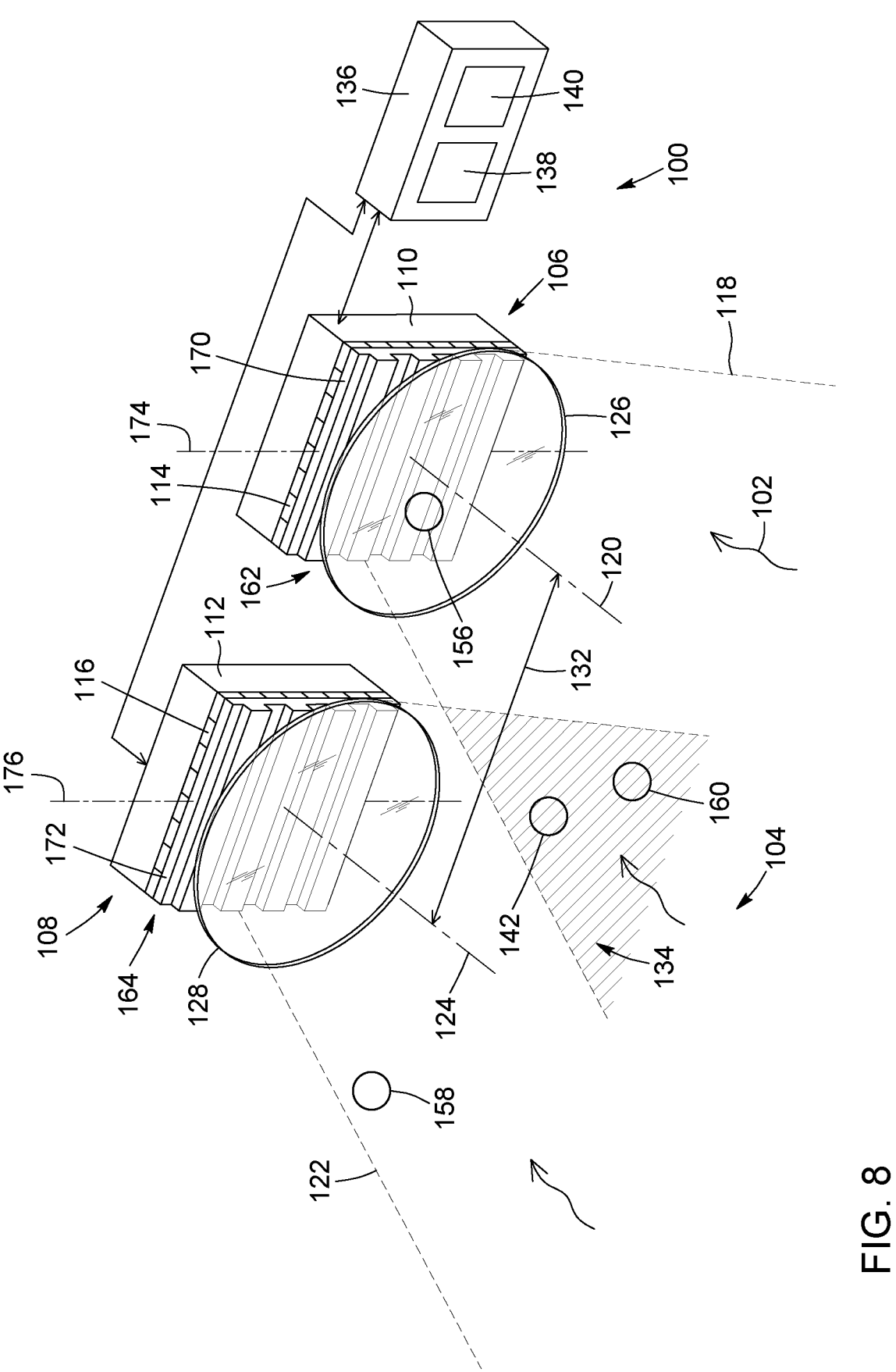
FIG. 8 is a schematic perspective view of an imaging system, in accordance with another embodiment.

Referring to FIG. 8, there is illustrated another embodiment of an imaging system 100 which can provide depth sensing in a mixed mode of stereoscopic and TDM-based imaging. The imaging system 100 generally includes a first image capture device 106, a second image capture device 108, and a computer device 136. The embodiment of FIG. 8 shares several features with the embodiment of FIGS. 1 to 3, which will not be described again other than to highlight differences between them. In FIG. 8, the first and second image capture devices 106, 108 each include a TDM 162, 164 having a diffraction grating 170, 172 whose grating axis 174, 176 is vertical, rather than horizontal as in FIGS. 1 to 3. In such a case, the TDM baselines associated with the first and second TDM disparity maps are both perpendicular to the stereoscopic baseline, so that the TDM image data is expected to provide depth information that is complementary to that provided by the stereoscopic image data in terms of its sensitivity to feature orientation. That is, the TDM image data is expected to provide better depth estimates for horizontally oriented features, while the stereoscopic image data is expected to provide better depth estimates for vertically oriented features. This means that the stereoscopic confidence weight, the first TDM confidence weight, and the second TDM confidence weight can be assigned different weights based on feature orientations.

Figure 9:
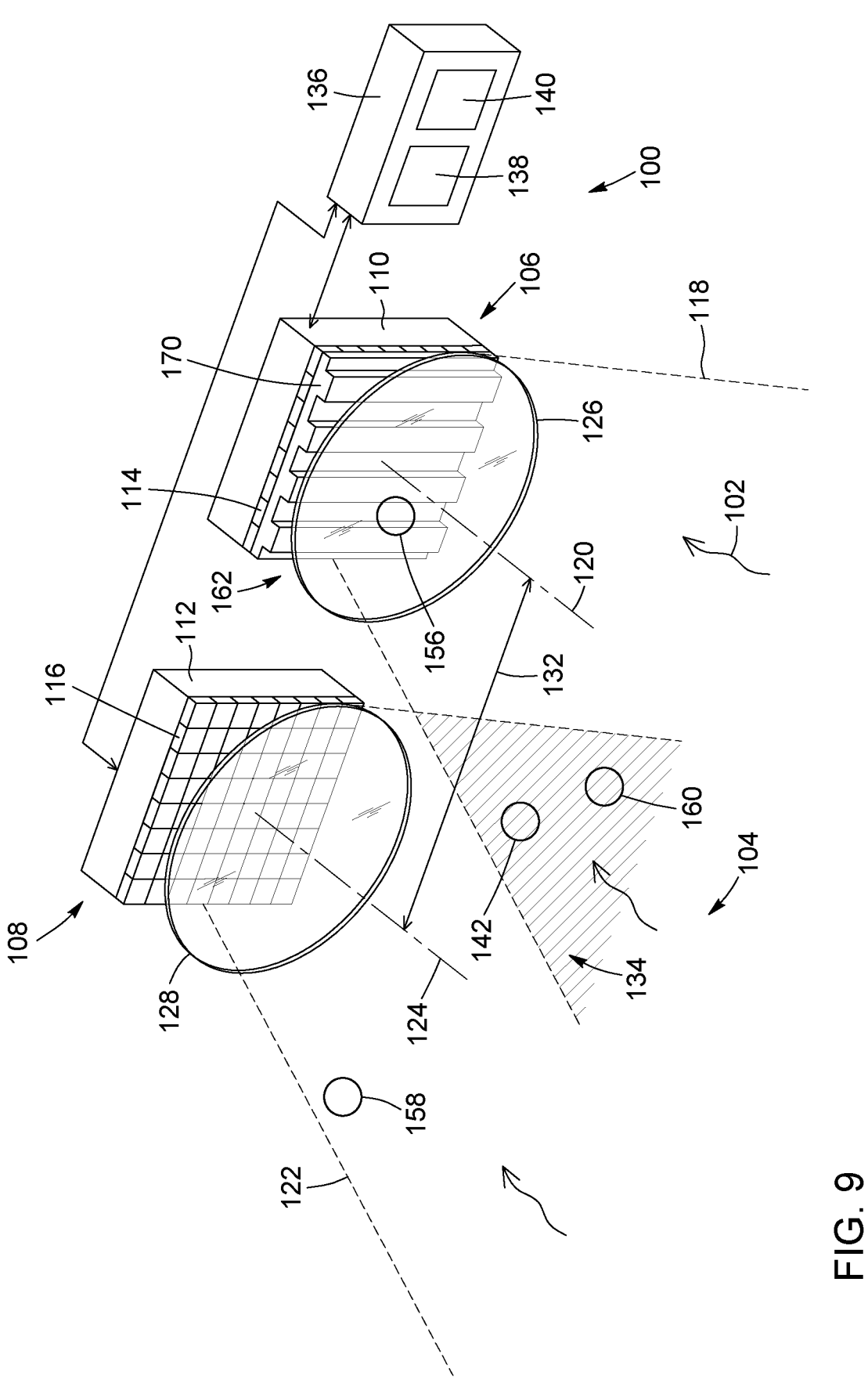
FIG. 9 is a schematic perspective view of an imaging system, in accordance with another embodiment.

Referring to FIG. 9 there is illustrated another embodiment of an imaging system 100 which can provide depth sensing in a mixed mode of stereoscopic and TDM-based imaging. The imaging system 100 generally includes a first image capture device 106, a second image capture device 108, and a computer device 136. The embodiment of FIG. 9 shares several features with the embodiment of FIGS. 1 to 3, which will not be described again other than to highlight differences between them. In contrast to the embodiment of FIGS. 1 to 3, in the embodiment of FIG. 9, only the first image capture device 106 includes a TDM 162 and thus can be used to acquire TDM depth information about the scene 104. In FIG. 9, the computer device 136 may be configured to process first TDM depth information captured by the first image capture device 106 and stereoscopic depth information obtained from first image data captured by the first image capture device 106 and second image data captured by the second image capture device 108. The computer device 136 may be configured to process the first TDM depth information and the stereoscopic depth information to provide combined or enhanced depth information about the scene 104. The first TDM depth information may be used to provide, alone, depth information associated with regions of the scene 104 that are visible in the field of view 118 of the first image capture device 106 but are outside the stereoscopic overlap region 134. Furthermore, a combination of the first TDM depth information and the stereoscopic depth information may be used to provide depth information associated with features of the scene 104 inside the stereoscopic overlap region 134. Depending on the application, a variety of image processing techniques and algorithms may be used to combine or otherwise process the first TDM depth information and the stereoscopic depth information. For example, as noted above, the first TDM depth information and the stereoscopic depth information may be combined according to a weighted combination, where the weights are assigned on a per-pixel basis based on one or more quality or confidence criteria associated with the different sources of depth information. In some embodiments, a weighing approach based on the object distance may be implemented, where stereoscopic depth information may be attributed a greater confidence weight at farther range and a lesser confidence weight at closer range, and vice versa for the first TDM depth information.

Figure 10:
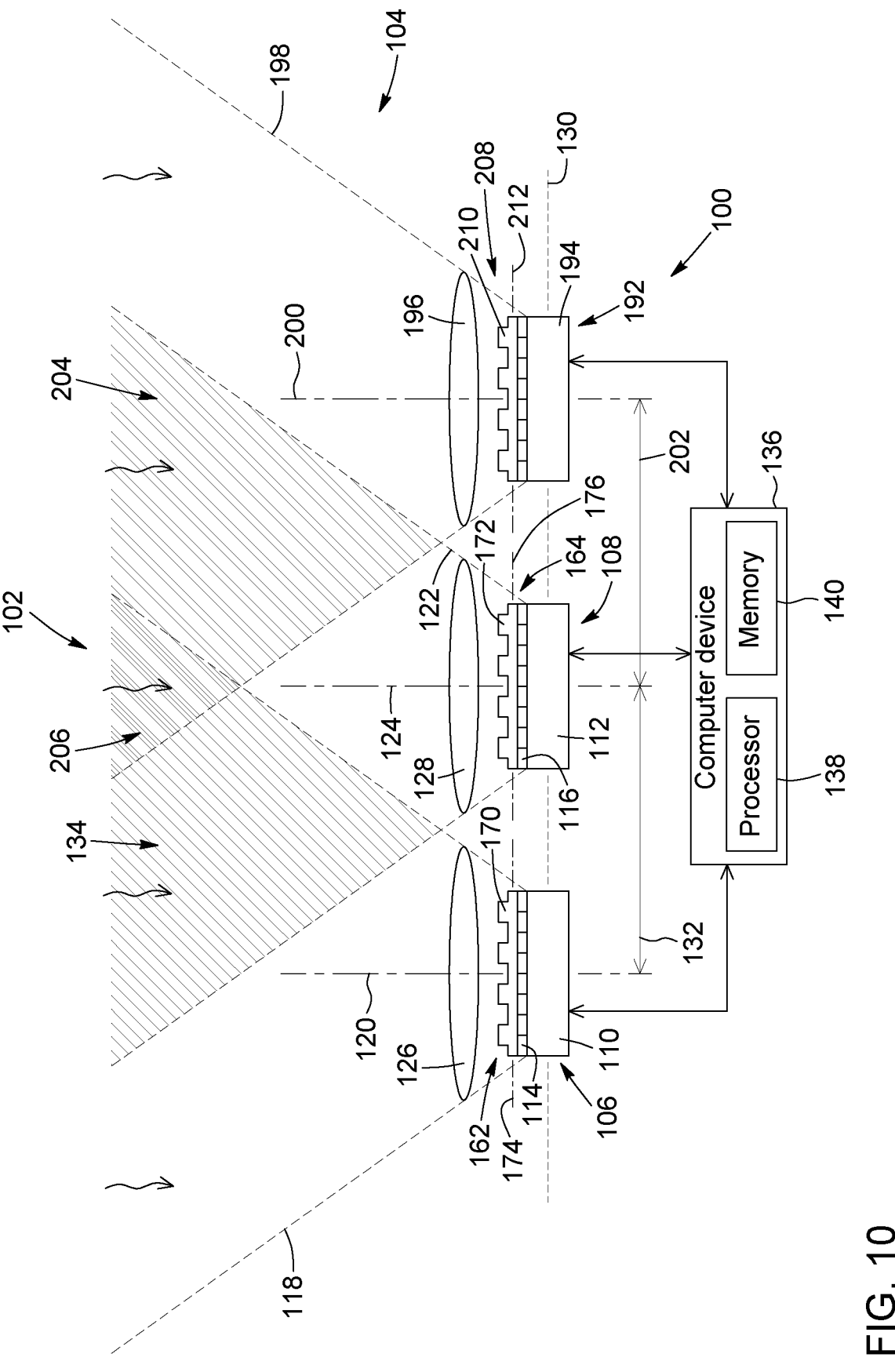
FIG. 10 is a schematic top plan view of an imaging system, in accordance with another embodiment.

Referring to FIG. 10, there is illustrated another embodiment of an imaging system 100 for capturing image data representative of light 102 received from a scene 104. The embodiment of FIG. 10 shares several features with the embodiment of FIGS. 1 to 3, which will not be described again other than to highlight differences between them. In contrast to the embodiment of FIGS. 1 to 3, in which the imaging system 100 may be considered a stereoscopic imaging system, the imaging system 100 of FIG. 10 includes a first image capture device 106, a second image capture device 108, and a third image capture device 192 configured to image the scene 104 from three different viewpoints, such that the imaging system 100 may be considered a multiscopic imaging system. It is appreciated that more than three image capture devices can be used in other multiscopic applications, and that the present techniques are not bounded by an upper limit of the number of image capture devices in the imaging system.

In FIG. 10, the image capture devices 106, 108, 192 each include an image sensor 110, 112, 194, for example, a CMOS or a CCD sensor array, and associated imaging optics 126, 128, 196. Each image capture device 106, 108, 192 also has a respective field of view 118, 122, 198 with an associated optical axis 120, 124, 200. The fields of view 118, 122, 198 are different from one another in order to provide the three different viewpoints and enable multiscopic stereoscopic imaging. It is appreciated, however, that although the three fields of view 118, 122, 198 are depicted in FIG. 10 as having the same size and shape, this may not be the case in other embodiments.

In the illustrated embodiment, the image capture devices 106, 108, 192 are arranged along a line 130. In such a case, the first optical axis 120 and the second optical axis 124 are separated one from the other by a first stereoscopic baseline distance 132, and the second optical axis 124 and the third optical axis 200 are separated one from the other by a second stereoscopic baseline distance 202. In other embodiments, the image capture devices 106, 108, 192 may have different or more complex arrangements in terms of relative position and orientation. For example, the image capture devices 106, 108, 192 may be disposed along a curve or a surface. In some embodiments, the image capture devices 106, 108, 192 may be substantially identical to each other, apart from their physical location and, possibly, their orientation. However, in other embodiments, the image capture devices 106, 108, 192 may differ in one or more other respects, for example, in their structure, configuration, or operation, or any combination thereof.

The first field of view 118 and the second field of view 122 overlap over a first stereoscopic overlap region 134 (single-line hatching), the second field of view 122 and the third field of view 198 overlap over a second stereoscopic overlap region 204 (double-line hatching), and the three fields of view 118, 122, 198 overlap over a multiscopic overlap region 206 (triple-line hatching). The first stereoscopic overlap region 134 defines the portion of the scene 104 for which stereoscopic imaging can be performed using image data acquired by the first and second image capture devices 106, 108, the second stereoscopic overlap region 204 defines the portion of the scene 104 for which stereoscopic imaging can be performed using image data acquired by the second and third image capture devices 108, 192, and the multiscopic overlap region 206 defines the portions of the scene 104 for which multiscopic imaging can be performed using image data acquired by the three image capture devices 106, 108, 192.

Referring still to FIG. 10, the imaging system 100 also includes a computer device 136 operatively coupled to the three image capture devices 106, 108, 192. The computer device 136 may be configured to process first, second, and third image data received from the first, second, and third image sensors 110, 112, 194, respectively. In some embodiments, a combination of the first and second image data may be used to provide stereoscopic imaging information about the scene 104, and likewise for a combination of the second and third image data. The stereoscopic imaging information may be used to provide a stereoscopic disparity or depth map, or other depth perception information. In some embodiments, a combination of the first, second, and third image data may be used to provide multiscopic imaging information about the scene 104, which may be used to provide a multiscopic disparity or depth map, or other depth perception information. In some embodiments, the computer device 136 may be configured to control the image capture devices 106, 108, 192 to provide synchronization or time coordination between their image capture operations, although this is not a requirement. It is appreciated that various techniques for multiscopic matching and disparity estimation exist and may be used herein for computing depth from multiple sets of image data acquired from multiple different viewpoints. It is also appreciated that the theory and applications of multiscopic matching and depth mapping techniques are generally known in the art, and need not be described in detail herein other than to facilitate an understanding of the present disclosure.

As for conventional stereoscopic imaging, conventional multiscopic imaging may only be performed for portions of the scene 104 that are within the multiscopic overlap region 206 and that are visible (e.g., non-occluded) to all three image sensors 110, 112, 194. In order to overcome or alleviate these limitations, the imaging system 100 illustrated in FIG. 10 provides for 3D imaging and depth sensing in a mixed mode of multiscopic/stereoscopic imaging and diffraction-grating-based imaging. For this purpose, each of the image capture devices 106, 108, 192 in FIG. 10 includes a TDM 162, 164, 208 disposed over its respective image sensor 110, 112, 194. As described above, the provision of the TDMs 162, 164, 208 imparts each of the image capture devices 106, 108, 192 with standalone monoscopic 3D imaging capabilities, including depth sensing capabilities, within its individual field of view 118, 122, 198. This means that the three image capture devices 106, 108, 192 may be used both individually, as standalone monoscopic depth sensors, and in combination, as a TDM-supplemented multiscopic depth sensor. It is appreciated that, depending on the application, one, some, or all of the image capture devices 106, 108, 192 may include a TDM. Thus, in general, in the case of a multiscopic imaging system that includes n image capture devices, n being an integer greater than two, the number of image capture devices that include a TDM may range from 1 to n. It is appreciated that when n≥2, different ones of the n TDMs may have different grating parameters, such as those listed above, including different grating orientations.

In FIG. 10, the TDMs 162, 164, 208 each include at least one diffraction grating 170, 172, 210. Each diffraction grating 170, 172, 210 may be characterized by a grating axis 174, 176, 212 and a grating profile having a grating period along the grating axis 174, 176, 212. In particular, each diffraction grating 170, 172, 210 is a binary phase grating with a square-wave grating profile. In the illustrated embodiment, each TDM 162, 164, 208 includes a single diffraction grating 170, 172, 210, although multiple diffraction gratings may be used in other embodiments. Furthermore, the three diffraction gratings 170, 172, 210 have parallel grating axes 174, 176, 212 and identical grating profiles. However, this need not be the case in other embodiments, where any or all of the TDMs 162, 164, 208 may differ from one another in one or more respects.

The computer device 136 is configured to process first, second, and third image data received from the first, second, and third image capture devices 106, 108, 192 to provide first, second, and third TDM depth information, respectively. The portion of the first and second image data associated with the first stereoscopic overlap region 134 may be processed to obtain first stereoscopic depth information, while the portion of the second and third image data associated with the second stereoscopic overlap region 204 may be processed to obtain second stereoscopic depth information. Furthermore, the portion of the first, second, and third image data associated with the multiscopic overlap region 206 may be processed to obtain multiscopic depth information. In some embodiments, the image data used in obtaining the first and second stereoscopic depth information and the multiscopic depth information may include summed pixel responses, such as described by Equation (3).

In some embodiments, the computer device 136 may be configured to process the first, second, and third TDM depth information, the first and second stereoscopic depth information, and the multiscopic depth information to provide enhanced or combined depth information. The TDM depth information and the stereoscopic depth information may be used such as described above. Furthermore, the TDM depth information and the multiscopic depth information may be combined according to various image processing techniques to provide depth information associated with features of the scene 104 inside the multiscopic overlap region 206. In some embodiments, the TDM depth information and the multiscopic depth information may be combined or fused according to a weighing approach, in which weights are assigned on a per-pixel basis based on one or more quality or confidence criteria associated with the different sources of depth information, as described above. For example, the weighing approach may attribute a greater confidence weight to the multiscopic depth information at farther distances and a greater confidence weight to the TDM depth information at closer distances. In such cases, the TDM depth information may be complementary to the multiscopic depth information to provide enhanced depth determination over a larger region of a scene.

Figure 11:
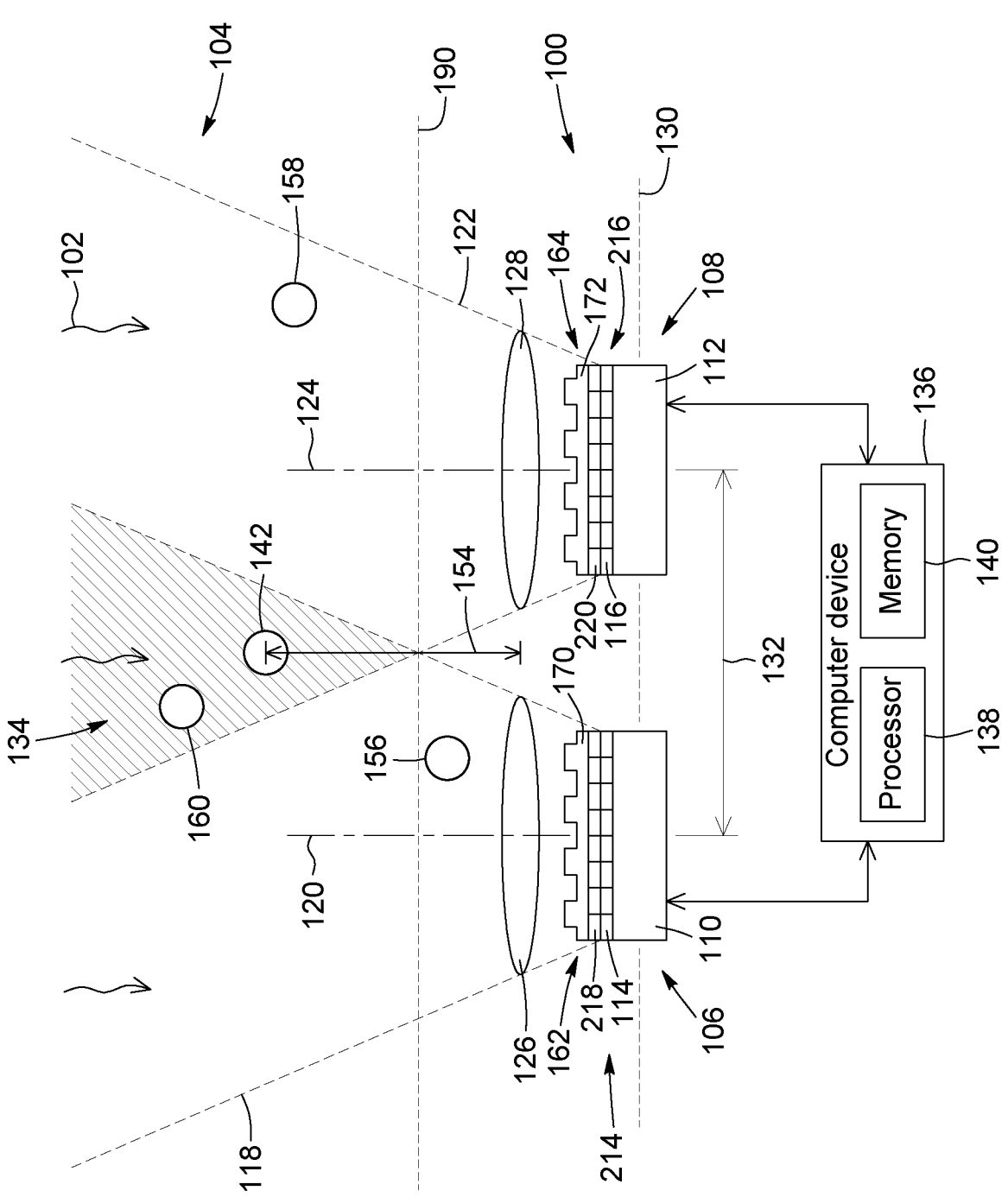
FIG. 11 is a schematic top plan view of an imaging system, in accordance with another embodiment.

Referring to FIG. 11, there is illustrated another embodiment of an imaging system 100 which can be used for dual TDM and stereoscopic depth imaging. The embodiment of FIG. 11 shares several features with the embodiment of FIGS. 1 to 3, which will not be described again other than to highlight differences between them. In contrast to the embodiment of FIGS. 1 to 3, which is intended for monochrome applications, the embodiment of FIG. 11 is intended for color applications. In FIG. 11, the image sensor 110, 112 of each image capture device 106, 108 includes a color filter array 214, 216 interposed between the TDM 162, 164 and the array of pixels 114, 116. The color filter array 214, 216 includes a plurality of color filters 218, 220 arranged in a mosaic color pattern. The color filter array 214, 216 is configured to filter the diffracted light produced by the TDM 162, 164 spatially and spectrally according to the mosaic color pattern prior to detection of the diffracted light by the array of pixels 114, 116. In some embodiments, the color filters 218, 220 may include red (R), green (G), and blue (B) filters, although other filters may alternatively or additionally be used in other embodiments, such as yellow (Y) filters, cyan (C) filters, magenta (M) filters, clear or white (W) filters, and infrared (IR) filters. In some embodiments, the mosaic color pattern of the color filter array 214, 216 may be an RGGB Bayer pattern, although other mosaic color patterns may be used in other embodiments, including both Bayer-type and non-Bayer-type patterns. Non-limiting examples include, to name a few, RGB-IR, RGB-W, CYGM, and CYYM patterns. In color implementations, TDM-based depth estimates may be determined on a percolor basis by parsing the pixel data according to color components, for example, based on techniques such as, or similar to, those described in co-assigned international patent applications PCT/CA2017/050686 (published as WO 2017/210781), PCT/CA2018/051554 (published as WO 2019/109182), and PCT/CA2020/050760 (published as WO 2020/243828).

Figure 12:
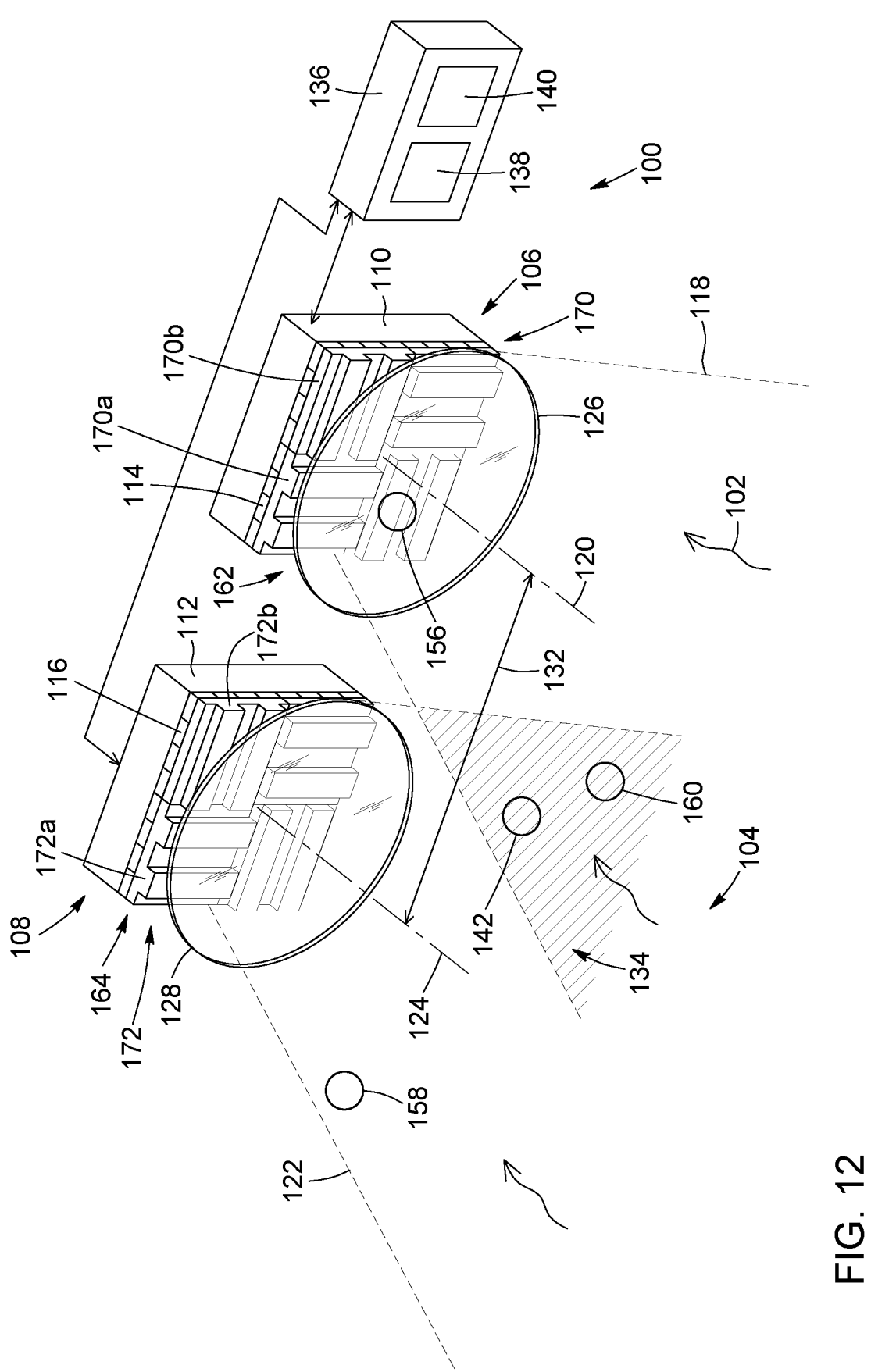
FIG. 12 is a schematic perspective view of an imaging system, in accordance with another embodiment.

For simplicity, several embodiments described above include TDMs provided with a single diffraction grating and, thus, a single grating orientation. However, it is appreciated that, in practice, TDMs will generally include a large number of diffraction gratings forming grating tile with multiple grating orientations. Referring to FIG. 12, there is illustrated another embodiment of an imaging system 100 which can provide depth sensing in a mixed mode of stereoscopic and TDM-based imaging. The imaging system 100 generally includes a first image capture device 106, a second image capture device 108, and a computer device 136. The embodiment of FIG. 12 shares several features with the embodiment of FIGS. 1 to 3, which will not be described again other than to highlight differences between them. In FIG. 12, the first and second image capture devices 106, 108 each include a TDM 162, 164 having a plurality of diffraction gratings 170, 172. In each TDM 162, 164, the plurality of diffraction gratings 170, 172 includes a first set of diffraction gratings 170a, 172a and a second set of diffraction gratings 170b, 172b, where the grating axes of the diffraction gratings 170a, 172a of the first set extend perpendicularly to the grating axes of the diffraction gratings 170b, 172b of the second set, thus providing orthogonal grating orientations. In the embodiment illustrated in FIG. 12, the first set of diffraction gratings 170a, 172a and the second set of diffraction gratings 170b, 172b are interleaved in rows and columns to define a checkerboard pattern. It is appreciated that any other suitable regular or irregular arrangements of orthogonally or non-orthogonally oriented sets of diffraction gratings may be used in other embodiments. For example, in some variants, the orthogonally oriented sets of diffraction gratings may be arranged to alternate only in rows or only in columns, or be arranged randomly. Other variants may include more than two sets of diffraction gratings. Providing TDMs with multiple grating orientations can be advantageous as it can allow depth estimates to be determined for multiple feature orientations.

It is appreciated that although several embodiments described above include TDMs provided with one-dimensional, binary phase gratings formed of alternating sets of parallel ridges and grooves defining a square-wave grating profile, other embodiments may use TDMs with other types of diffraction gratings. For example, other embodiments may use diffraction gratings where any, some, or all of the grating period, the duty cycle, and the step height are variable; diffraction gratings with non-straight features perpendicular to the grating axis; diffraction gratings having more elaborate grating profiles; 2D diffraction gratings; photonic crystal diffraction gratings; and the like. The properties of the diffracted wavefront may be tailored by proper selection of the grating parameters. Furthermore, in embodiments where TDMs include multiple sets of diffraction gratings, such as in FIG. 12, the diffraction gratings in different sets need not be identical. In general, a TDM may be provided as a grating tile made up of many grating types, each grating type being characterized by a particular set of grating parameters. Non-limiting examples of such grating parameters include the grating orientation, the grating period, the duty cycle, the step height, the number of grating periods, the lateral offset with respect to the underlying pixels and/or color filters, the grating-to-sensor distance, and the like.

In some embodiments, TDM image data can be leveraged to enhance or improve stereoscopic or multiscopic matching. Stereoscopic matching methods aim to solve the problem of finding matching pairs of corresponding image points from two images of the same scene acquired from different viewpoints in order to obtain a disparity map from which depth information about the scene can be determined. Using epipolar image rectification to constraint corresponding pixel pairs to lie on conjugate epipolar lines can reduce the problem of searching for corresponding image points from a two-dimensional search problem to a one-dimensional search problem. Under the epipolar constraint, the linear, typically horizontal, pixel shift or distance between points of a corresponding image pair defines the stereoscopic disparity. It is appreciated that although using epipolar image rectification can simplify the stereoscopic correspondence problem, conventional stereoscopic matching methods can remain computationally expensive and time-consuming.

Stereoscopic matching methods generally attempt to match pixels in one image with pixels in the other image. Some of these methods can use block matching techniques. Block matching involve defining a small template block of pixels around each pixel in the first image and searching for the closest matching block in the second image by shifting the template block along the epipolar line. A variety of techniques can be used to evaluate the degree of similarity (or dissimilarity) between the template block and candidate blocks and to find a closest matching block. Non-limiting examples of such techniques include, to name a few, sum of squared differences (SSD) techniques, sum of absolute differences (SAD) techniques, normalized cross-correlation (NCC) techniques, and rank and census transform techniques. In general, the shifting of the template block along the epipolar line in search of the closest matching block is performed within a certain disparity search range. The disparity search range defines the minimum and maximum disparity values associated with a given pair of stereoscopic images. The use of a disparity search range can improve the performance of stereoscopic matching techniques and reduce the computational time and resource cost associated with their implementation. However, the determination of an appropriate disparity search range is a complex problem. In some embodiments, the present techniques can use TDM depth information to improve the determination of the stereoscopic disparity search range.

Figure 13:
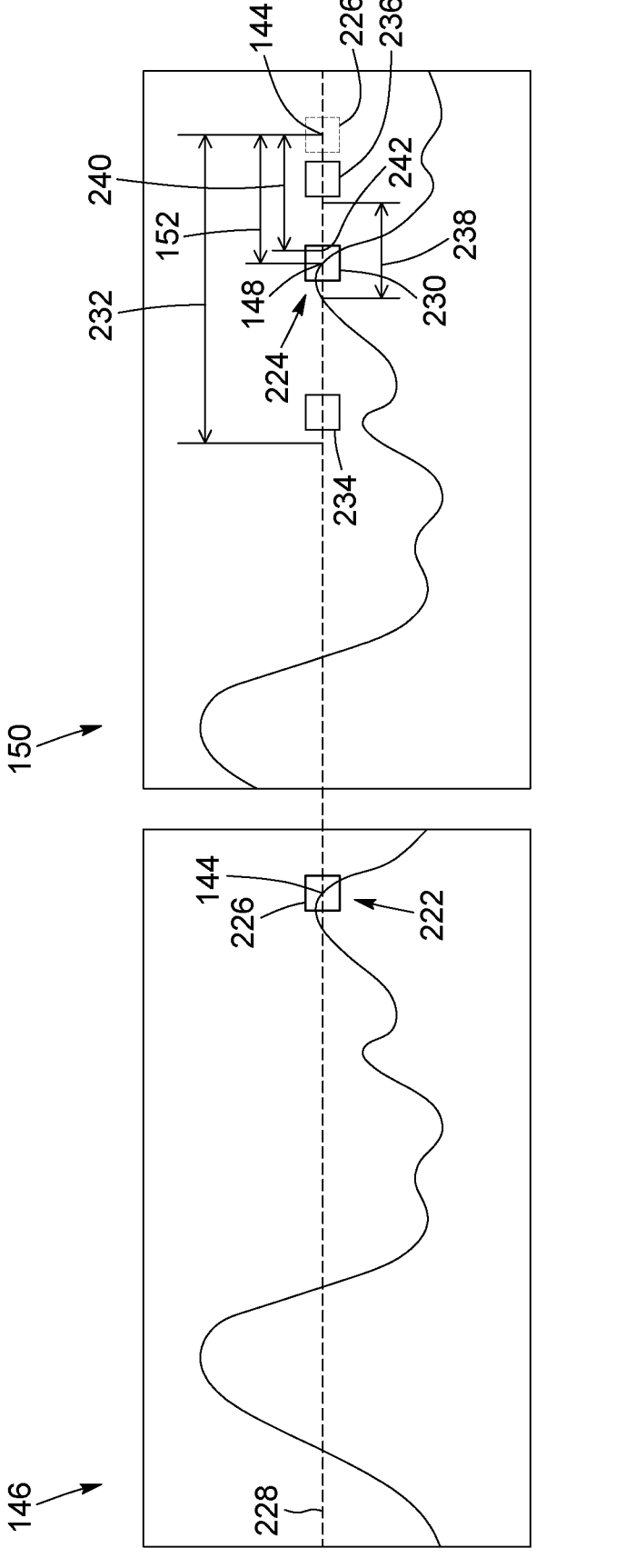
FIG. 13 is a schematic representation of a stereoscopic image pair including a first image and a second image representing two different viewpoints of a scene and acquired by a TDM-equipped stereoscopic imaging system.

Referring to FIG. 13, there is depicted a stereoscopic image pair including a first image 146 and a second image 150 representing two different viewpoints of a scene and acquired by a TDM-equipped stereoscopic imaging system such as, or similar to, those described above. The imaging system includes a first image capture device configured to acquire first image data used to obtain the first image and a second image capture device configured to acquire second image data used to obtain the second image. Depending on the application, either or both of the first and second image capture devices can include a TDM to acquire TDM depth information about the scene. The first image 146 includes a feature 222 having a first pixel location 144. The stereoscopic correspondence problem of finding the pixel location 148 of the corresponding feature 224 in the second image 150 can be solved using a block matching method.

In some embodiments, the block matching method can include a step of defining a template pixel block 226 around the pixel location 144 of the feature 222 of the first image 146. For example, under epipolar constraint, a block of N×M pixels may be used, where N and M may be adjusted depending on the application. The method may also include a step of placing the template block at the same pixel location 144 in the second image 150 and shifting the template block 226 along the epipolar line 228 in search of the closest matching block 230. The search for the closest matching pixel block 230 may be performed within a stereoscopic disparity search range 232, $D_{search}$, having a certain size (e.g., a number of pixels), which may depend on the stereoscopic baseline distance and the size of the input image. In conventional stereoscopic block matching methods, the stereoscopic disparity search range 232 may be determined in different ways, for example, based on a depth working range. The closest matching block 230 contains feature 224 and is centered around pixel location 148. In conventional block matching techniques, a template match is performed for a number of candidate blocks 234, 236 over the entire stereoscopic disparity search range 232, corresponding to a number of different possible disparity values ranging from zero up to $D_{search}$ for the stereoscopic disparity $d_{stereo}$.

In general, the larger the stereoscopic disparity search range 232, the longer the computational time and the higher the computational cost associated with stereoscopic matching. This can be a limitation or a drawback in some applications, especially when considering that stereoscopic matching may have to be carried out for every pixel of the first image 146. In some embodiments, TDM depth information may be used to refine the coarse stereoscopic disparity search range 232, $D_{search}$, to produce a refined stereoscopic disparity search range 238, $D_{search,TDM} < D_{search}$. For example, the determination of the refined stereoscopic disparity search range 238 can include a step of determining an uncertainty measure associated with the TDM depth information, and a step of determining refined stereoscopic disparity search range 238 based on the uncertainty measure. In some embodiments, the method may include a step of determining a depth, $z_{TDM}$, of feature 222 in the first image 146 using the first TDM depth information, and a step of converting the depth $z_{TDM}$ into a TDM-based stereoscopic disparity 240, $d_{stereo,TDM}$. In some embodiments, the TDM-based stereoscopic disparity $d_{stereo}$,TDM may be determined from $z_{TDM}$ using Equation (1), in which case $d_{stereo,TDM} = bf/z_{TDM}$. The method may also include a step of determining the refined stereoscopic disparity search range 238 from the TDM-based stereoscopic disparity 240, for example, by adding uncertainty bounds $\pm\zeta_{TDM}$ to the depth estimate $z_{TDM}$ determined from the TDM depth information. In such a case, the refined stereoscopic disparity search range 238 to be used for stereoscopic matching has a length $D_{search,TDM} = 2bf \times [\zeta_{TDM}/(z_{TDM}^2 \pm \zeta_{TDM}^2)]$ and is centered at pixel location 242, which is separated by $d_{stereo,TDM}$ from the first pixel location 144. The uncertainty bounds $\pm\zeta_{TDM}$ represent the expected uncertainty in the determination of the TDM-based depth estimate $z_{TDM}$. The values selected for $\pm\zeta_{TDM}$ can depend on various factors, including the value of $z_{TDM}$ itself (e.g., TDM may be expected to increase as $z_{TDM}$ increases), and other parameters associated with the TDM depth information (e.g., contrast level, color content, edge angle, noise level, spatial frequency, object position in the field of view). It is noted that the computation of the refined stereoscopic disparity search range $D_{search,TDM}$ can be simplified for the arrangement mentioned above in which the first optical axis 120 and the second optical axis 124 intersect at a point in space located in the object focal plane of both the first image capture device 106 and the second image capture device 108. This is because, in such a case, if the scaling between the TDM disparity $d_{TDM}$ and the stereoscopic disparity $d_{stereo}$ is known (e.g., from calibration), then $D_{search,TDM}$ may be determined from an uncertainty measure associated with $d_{TDM}$ itself, rather than by computing a depth parameter $z_{TDM} \pm \zeta_{TDM}$ from $d_{TDM}$, and then converting the depth parameter $z_{TDM} \pm \zeta_{TDM}$ thus determined back to the disparity space to obtain $D_{search,TDM}$.

Once the refined stereoscopic disparity search range 238 has been determined, it can be used to perform conventional stereoscopic block matching to find the pixel location 148 of the closest matching block 230 and the associated stereoscopic disparity 152, $d_{stereo}$. It is appreciated that depending on the application, the stereoscopic disparity $d_{stereo}$ may or may not coincide with the TDM-based stereoscopic disparity $d_{stereo,TDM}$, although the two disparity values are expected to be close to each other. Since the computational efforts involved in determining $z_{TDM}$, $\zeta_{TDM}$, and $d_{stereo,TDM}$ can be substantially less intensive than those involved in stereoscopic block matching, the gain in computational time and resource cost achieved by the determination and use of a refined stereoscopic disparity search range can be significant in some applications. One example is imaging systems having large stereoscopic baseline distances, whose stereoscopic disparity search ranges also tend to be large. It is appreciated that refining the stereoscopic disparity search range can also alleviate other challenges that are commonly associated with large stereoscopic baseline distances, such as the high geometric (large rotation and translation) and high photometric (illumination changes) difference between the first image 146 and the second image 150. Those challenge tend to introduce biases during the stereoscopic disparity estimation, which can make the stereoscopic depth information less accurate or reliable. Having a refined stereoscopic disparity search range can reduce or remove those biases.

It is noted that the techniques described herein for refining a stereoscopic disparity search range may not use TDM depth information, but may use another source of depth information encoded by two subsets of pixels having different angular responses. In some embodiments, the present techniques provide a stereoscopic imaging method of imaging a scene. The stereoscopic imaging method can include a step of capturing first image data from light received from the scene within a first field of view of the scene, and capturing second image data from light received from the scene within a second field of view of the scene different from the first field of view and overlapping with the first field of view over a stereoscopic overlap region of the scene. Depending on the application, either or both of the first image data and the second image data includes a first subset of pixel responses and a second subset of pixel responses that vary differently from each other as a function of angle of incidence of the received light to encode depth information about the scene. The stereoscopic imaging method can also include a step of determining a stereoscopic disparity search range based on the encoded depth information, for example, based on the embodiments described above. The stereoscopic imaging method can further include determining stereoscopic depth information about the scene within the stereoscopic overlap region by performing a stereoscopic matching operation between the first image data and the second image data based on the stereoscopic disparity search range, for example, based on the embodiments described above. In some embodiments, encoding the depth information about the scene in the first subset of pixel responses and the second subset of pixel responses can include passing the light received from the scene through a transmissive diffraction mask, such as described above.

In some embodiments, the present techniques may be used to identify and/or correct or compensate for a loss of calibration or other anomalies in the operation of TDM-equipped stereoscopic or multiscopic imaging systems such as, or similar to, those described above or similar systems. Both stereoscopic depth imaging systems and TDM-based depth imaging systems generally rely on calibration for their operation. Calibrated parameters for stereoscopic depth imaging may include the focal length and the relative position (e.g. the stereoscopic baseline distance) and orientation of the image capture devices. Calibrated parameters for TDM-based depth imaging may include the focal length, focal distance, lens tilt, and lens shift associated with the imaging optics of the image capture devices. The imaging systems described herein can provide at least two sources of depth information. For example, an stereoscopic imaging system including two TDM-equipped image capture devices can provide three independent sources of depth information, namely first TDM depth information acquired by the first image capture device, second TDM depth information acquired by the second image capture device, and stereoscopic depth information obtained from first image data acquired by the first image capture device and second image data acquired by the second image capture device.

In some embodiments, the observation of mismatches or discrepancies between the different sources of depth information may be leveraged to identify potential calibration issues or other anomalies. In some embodiments, the method can include a step of identifying a mismatch between the stereoscopic depth information and the TDM depth information, and a step of determining a cause of the mismatch as relating to an anomaly in either the stereoscopic depth information or the TDM depth information based on confidence weights assigned to the stereoscopic depth information and the TDM depth information. The anomaly can be a loss of calibration. In some embodiments, once a loss of calibration has been identified, a recalibration operation may be performed using the different sources of depth information. In some embodiments, if two of the three sources of depth information are consistent with each other but inconsistent with the third source of depth information, this may be an indication that the calibration data associated with the third source of depth information needs a recalibration. For example, if there is match between the first and second TDM depth information but a mismatch between the stereoscopic depth information and the first and second TDM depth information, this may be an indication that the actual value of the stereoscopic baseline distance between the first and second image captures differ non-negligibly from its calibrated value. In such a case, a new calibrated value of the stereoscopic baseline distance may be determined that provides a match between the stereoscopic depth information and the first and second TDM depth information. In embodiments where only two sources of depth information are available, that is, one source of TDM depth information and one source of stereoscopic depth information, a confidence level may be attributed to each source. For example, as noted above, the stereoscopic depth information may be attributed a greater confidence weight than the TDM depth information at farther range, and a lesser confidence weight at closer range. In such a case, if inconsistencies in depth estimates are observed at far range, it may be assumed that the calibration data used in determining the TDM depth information should be recalibrated, and vice versa if inconsistencies are observed at close range. In some embodiments, another approach may involve looking at multiple object distances across a portion or the entirety of the field of view of each image capture device. For example, if an object is detected as being flat in the stereoscopic depth map but not in the TDM depth map, it may be assumed that the calibration data associated with the TDM depth determination should be recalibrated.

Referring to FIG. 14, in accordance with another aspect, there is provided a flow diagram of an embodiment of a method 300 of imaging a scene. The method 300 may be implemented with an imaging system such as the ones described above with references to FIGS. 1 to 13, or another imaging system. The method 300 includes a step 302 of capturing, with a first image capture device, first image data from the scene within a first field of view of the scene, the first image capture device including a first transmissive diffraction mask (TDM) configured to encode first TDM depth information about the scene in the first image data. In some embodiments, the step 302 of capturing the first image data can include a step of diffracting, with the first TDM, a first portion of light received from the scene to generate first diffracted light, where the first diffracted light encodes, as the first TDM depth information, information indicative of an angle of incidence of the received light. In such embodiments, the step 302 of capturing the first image data can also include a step of detecting, with a first set of pixels of the first image capture device, the diffracted light and generating therefrom a respective first set of pixel responses as the first image data. The first set of pixel responses can include a first subset of pixel responses and a second subset of pixel responses, wherein the first subset of pixel responses and the second subset of pixel responses vary differently from each other as a function of the angle of incidence of the received light to provide a difference in viewpoints that encodes the first TDM depth information. In some embodiments, the first and the second subsets of pixel responses have magnitudes that respectively increase and decrease as the angle of incidence of the received light increases.

The method 300 also includes a step 304 of capturing second image data from the scene within a second field of view different from the first field of view and overlapping with the first field of view over a stereoscopic overlap region of the scene. In some embodiments, the capturing steps 302, 304 are performed concurrently. In other embodiments, the capturing steps 302, 304 are performed during non-overlapping time periods. In such embodiments, the second image data may be captured either with the first image capture device or with a second image capture device distinct from the first image capture device. In the latter case, the second image capture device can include a second TDM configured to encode second TDM depth information about the scene in the second image data.

In some embodiments, the step 304 of capturing the second image data can include a step of diffracting, with the second TDM, a second portion of light received from the scene to generate second diffracted light, where the second diffracted light encodes, as the second TDM depth information, information indicative of an angle of incidence of the received light. In such embodiments, the step 304 of capturing the second image data can also include a step of detecting, with a second set of pixels of the second image capture device, the diffracted light and generating therefrom a respective second set of pixel responses as the second image data. The second set of pixel responses can include a first subset of pixel responses and a second subset of pixel responses, wherein the first subset of pixel responses and the second subset of pixel responses vary differently from each other as a function of the angle of incidence of the received light to provide a difference in viewpoints that encodes the second TDM depth information. In some embodiments, the first and the second subsets of pixel responses have magnitudes that respectively increase and decrease as the angle of incidence of the received light increases.

Referring still to FIG. 14, the method 300 includes a step 306 of determining stereoscopic depth information about the scene within the stereoscopic overlap region based on the first and second image data. The method 300 also includes a step 308 of determining the first TDM depth information encoded in the first image data, and a step 310 of generating combined or fused depth information based on the stereoscopic depth information and the first TDM depth information. In embodiments where the second image data encodes second TDM depth information, the method 300 can include a step of determining the second TDM depth information encoded in the second image data, and the step 310 of generating the combined depth information can be based further on the second TDM depth information. In some embodiments, determining the first and second TDM depth information can include determining a first TDM disparity map and a second TDM disparity and determining therefrom a first TDM depth map and a second TDM depth map, respectively.

In some embodiments, the step 310 of generating the combined depth information can include a step of assigning a stereoscopic confidence weight to the stereoscopic depth information to obtain weighted stereoscopic depth information, a step of assigning a first TDM confidence weight to the first TDM depth information to obtain first weighted TDM depth information; a step of assigning a second TDM confidence weight to the second TDM depth information, if any, to obtain second weighted TDM depth information, and a step of generating the combined depth information based on the weighted stereoscopic depth information, the first weighted TDM depth information, and, if any, the second weighted TDM depth information. The different confidence weights may be assigned on a per-pixel basis based on various factors, non-limiting examples of which include object distance and object position within the first and second fields of view.

In some embodiments, the method 300 can include a step of identifying a mismatch between the stereoscopic depth information, the first TDM depth information, and, if any, the second TDM depth information, and a step of determining a cause of the mismatch as relating to an anomaly in any or all of the stereoscopic depth information, the first TDM depth information, and, if any, the second TDM depth information, based on the assigned confidence weights. In some embodiments, the method 300 can include a step of taking a corrective action, for example, a recalibration operation, in order to attempt to correct, at least in part, the anomaly.

In some embodiments, the method 300 can include a step of determining a stereoscopic disparity search range based on the first TDM depth information, and a step of determining the stereoscopic depth information based on the stereoscopic disparity search range. For example, in some embodiments, the determination of the stereoscopic disparity search range based on the first TDM depth information can include a step of determining an uncertainty measure associated with the first TDM depth information, and a step of determining the stereoscopic disparity search based on the uncertainty measure.

In some embodiments, the method 300 can include a step of capturing third image data from the scene within a third field of view different from the first and second fields of view and overlapping with the first and second fields of view over a multiscopic overlap region of the scene, a step of determining multiscopic depth information about the scene within the multiscopic overlap region based on the first, second, and third image data, and step of generating the combined depth information based further on the multiscopic depth information.

In accordance with another aspect of the present description, there is provided a non-transitory computer readable storage medium having stored thereon computer readable instructions that, when executed by a processor, cause the processor to perform various operations such as described herein. For example, the operations can include receiving first image data captured with a first image capture device having a first field of view of a scene, where the first image capture device includes a first TDM configured to encode first TDM depth information about the scene in the first image data; receiving second image data within a second field of view of the scene different from the first field of view and overlapping with the first field of view over a stereoscopic overlap region of the scene; determining stereoscopic depth information about the scene within the stereoscopic overlap region based on the first and second image data; determining the first TDM depth information about the scene encoded in the first image data; and generating combined depth information about the scene based on the stereoscopic depth information and the first TDM depth information.

In accordance with another aspect of the present description, there is provided a computer device including a processor and a non-transitory computer readable storage medium such as described herein and being operatively coupled to the processor. FIGS. 1 to 4 and 8 to 12 each depict an example of a computer device 136 that includes a processor 138 and a non-transitory computer readable storage medium 140 (also referred to above as a memory) operably connected to the processor 138.

Numerous modifications could be made to the embodiments described above without departing from the scope of the appended claims.

The invention claimed is:

1. An imaging system for imaging a scene, the imaging system comprising:

a plurality of image capture devices comprising:

a first image capture device having a first field of view of the scene, the first image capture device being configured to capture first image data from the scene within the first field of view, the first image capture device comprising a first transmissive diffraction mask (TDM) configured to encode first TDM depth information about the scene in the first image data; and a second image capture device having a second field of view of the scene different from the first field of view and overlapping with the first field of view over a stereoscopic overlap region of the scene, the second image capture device being configured to capture second image data from the scene within the second field of view; and a computer device operatively coupled to the plurality of image capture devices, the computer device comprising a processor and a non-transitory computer readable storage medium having stored thereon computer readable instructions that, when executed by the processor, cause the processor to perform operations, the operations comprising:

receiving the first image data from the first image capture device;

receiving the second image data from the second image capture device;

determining stereoscopic depth information about the scene within the stereoscopic overlap region based on the first and second image data;

determining the first TDM depth information encoded in the first image data; and generating combined depth information about the scene based on the stereoscopic depth information and the first TDM depth information, wherein the first TDM is configured to diffract a first portion of light received from the scene to generate first diffracted light, the first diffracted light encoding, as the first TDM depth information, information indicative of an angle of incidence of the received light;

wherein the first image capture device comprises a first image sensor having a first set of pixels configured to detect the first diffracted light and generate therefrom a respective first set of pixel responses as the first image data;

wherein the first set of pixels comprises a first subset of pixels and a second subset of pixels;

wherein the first set of pixel responses comprises a first subset of pixel responses corresponding to the first subset of pixels and a second subset of pixel responses corresponding to the second subset of pixels;

wherein the first subset of pixel responses and the second subset of pixel responses vary differently from each other as a function of the angle of incidence of the received light; and wherein determining the first TDM depth information comprises determining a first TDM disparity map from the first set of pixel responses, the first TDM disparity map being representative of a difference in viewpoints of the scene provided by the first subset of pixel responses and the second subset of pixel responses of the first set of pixel responses.

2. The imaging system of claim 1, wherein the first TDM disparity map comprises a first TDM baseline that is parallel or perpendicular to a stereoscopic baseline between the first image capture device and the second image capture device.

3. The imaging system of claim 1, wherein the stereoscopic depth information about the scene is determined based on, from the first image data, the first subset of pixel responses, or the second subset of pixel responses, or a sum of the first and second subsets of pixel responses, or a difference between the first and second subsets of pixel responses, or any combination thereof.

4. The imaging system of claim 1, wherein generating the combined depth information comprises:

assigning a stereoscopic confidence weight to the stereoscopic depth information to obtain weighted stereoscopic depth information;

assigning a first TDM confidence weight to the first TDM depth information to obtain first weighted TDM depth information; and generating the combined depth information based on the weighted stereoscopic depth information and the first weighted TDM depth information.

5. The imaging system of claim 4, wherein the stereoscopic confidence weight and the first TDM confidence weight are assigned based on an object distance, an object position within the first and/or the second field of view, a left-right consistency parameter associated with the stereoscopic depth information, an object orientation with respect to a stereoscopic baseline orientation associated with the stereoscopic depth information and to a TDM baseline orientation associated with the TDM depth information, an object occlusion parameter, or a combination thereof.

6. The imaging system of claim 1, wherein the operations performed by the processor further comprise:

determining a stereoscopic disparity search range based on the first TDM depth information; and determining the stereoscopic depth information based on the stereoscopic disparity search range.

7. The imaging system of claim 6, wherein determining the stereoscopic disparity search range based on the first TDM depth information comprises:

determining an uncertainty measure associated with the first TDM depth information; and determining the stereoscopic disparity search range based on the uncertainty measure.

8. The imaging system of claim 1, wherein:

the second image capture device comprises a second TDM configured to encode second TDM depth information about the scene in the second image data; and the operations performed by the processor further comprise:

determining the second TDM depth information encoded in the second image data; and generating the combined depth information based further on the second TDM depth information.

9. The imaging system of claim 1, wherein:

the plurality of image capture devices further comprises a third image capture device having a third field of view of the scene different from the first and second fields of view, wherein the first, second, and third fields of view overlap over a multiscopic overlap region of the scene, and wherein the third image capture device is configured to capture third image data from the scene within the third field of view; and the operations performed by the processor further comprise:

determining multiscopic depth information about the scene within the multiscopic overlap region based on the first, second, and third image data; and generating the combined depth information based further on the multiscopic depth information.

10. The imaging system of claim 9, wherein:

the third image capture device comprises a third TDM configured to encode third TDM depth information about the scene in the third image data; and the operations performed by the processor further comprise:

determining the third TDM depth information encoded in the third image data; and generating the combined depth information based further on the third TDM depth information.

11. An imaging method of imaging a scene, the imaging method comprising:

capturing, with a first image capture device, first image data from the scene within a first field of view of the scene, the first image capture device comprising a first transmissive diffraction mask (TDM) configured to encode first TDM depth information about the scene in the first image data;

capturing second image data from the scene within a second field of view different from the first field of view and overlapping with the first field of view over a stereoscopic overlap region of the scene;

determining stereoscopic depth information about the scene within the stereoscopic overlap region based on the first and second image data;

determining the first TDM depth information encoded in the first image data; and generating combined depth information based on the stereoscopic depth information and the first TDM depth information, wherein generating the combined depth information comprises:

assigning a stereoscopic confidence weight to the stereoscopic depth information to obtain weighted stereoscopic depth information;

assigning a first TDM confidence weight to the first TDM depth information to obtain first weighted TDM depth information; and generating the combined depth information based on the weighted stereoscopic depth information and the first weighted TDM depth information, wherein, within an imaging distance range, the stereoscopic confidence weight and the first TDM confidence weight respectively increases and decreases as the object distance increases;

wherein the stereoscopic confidence weight increases as a proximity of the object position relative to a center of the stereoscopic overlap region increases; and wherein the first TDM confidence weight increases as a proximity of the object position relative to a center of the first field of view increases.

12. The imaging method of claim 11, further comprising: identifying a mismatch between the stereoscopic depth information and the first TDM depth information;

determining a cause of the mismatch as relating to an anomaly in either the stereoscopic depth information or the first TDM depth information based on the stereoscopic confidence weight assigned to the stereoscopic depth information and the first TDM confidence weight assigned to the first TDM depth information; and taking a corrective action to correct, at least in part, the anomaly.

13. The imaging method of claim 11, wherein capturing the first image data and capturing the second image data are performed during non-overlapping time periods, and wherein the second image data is captured with the first image capture device.

14. The imaging method of claim 11, wherein the second image data is captured with a second image capture device distinct from the first image capture device.

15. The imaging method of claim 14, wherein:

the second image capture device comprises a second TDM configured to encode second TDM depth information about the scene in the second image data; and the imaging method further comprises:

determining the second TDM depth information encoded in the second image data; and generating the combined depth information based further on the second TDM depth information.

16. A non-transitory computer readable storage medium having stored thereon computer readable instructions that, when executed by a processor, cause the processor to perform operations, the operations comprising:

receiving first image data captured with a first image capture device having a first field of view of a scene, the first image capture device comprising a first transmissive diffraction mask (TDM) configured to encode first TDM depth information about the scene in the first image data;

receiving second image data within a second field of view of the scene different from the first field of view and overlapping with the first field of view over a stereoscopic overlap region of the scene;

determining stereoscopic depth information about the scene within the stereoscopic overlap region based on the first and second image data;

determining the first TDM depth information about the scene encoded in the first image data; and generating combined depth information about the scene based on the stereoscopic depth information and the first TDM depth information, wherein the first TDM is configured to diffract a first portion of light received from the scene to generate first diffracted light, the first diffracted light encoding, as the first TDM depth information, information indicative of an angle of incidence of the received light;

wherein the first image capture device comprises a first image sensor having a first set of pixels configured to detect the first diffracted light and generate therefrom a respective first set of pixel responses as the first image data;

wherein the first set of pixels comprises a first subset of pixels and a second subset of pixels;

wherein the first set of pixel responses comprises a first subset of pixel responses corresponding to the first subset of pixels and a second subset of pixel responses corresponding to the second subset of pixels;

wherein the first subset of pixel responses and the second subset of pixel responses vary differently from each other as a function of the angle of incidence of the received light; and wherein determining the first TDM depth information comprises determining a first TDM disparity map from the first set of pixel responses, the first TDM disparity map being representative of a difference in viewpoints of the scene provided by the first subset of pixel responses and the second subset of pixel responses of the first set of pixel responses.

17. A non-transitory computer readable storage medium having stored thereon computer readable instructions that, when executed by a processor, cause the processor to perform operations, the operations comprising:

receiving first image data captured with a first image capture device having a first field of view of a scene, the first image capture device comprising a first transmissive diffraction mask (TDM) configured to encode first TDM depth information about the scene in the first image data;

receiving second image data within a second field of view of the scene different from the first field of view and overlapping with the first field of view over a stereoscopic overlap region of the scene;

determining stereoscopic depth information about the scene within the stereoscopic overlap region based on the first and second image data determining the first TDM depth information about the scene encoded in the first image data; and generating combined depth information about the scene based on the stereoscopic depth information and the first TDM depth information, wherein generating the combined depth information comprises:

assigning a stereoscopic confidence weight to the stereoscopic depth information to obtain weighted stereoscopic depth information;

assigning a first TDM confidence weight to the first TDM depth information to obtain first weighted TDM depth information; and generating the combined depth information based on the weighted stereoscopic depth information and the first weighted TDM depth information, wherein, within an imaging distance range, the stereoscopic confidence weight and the first TDM confidence weight respectively increases and decreases as the object distance increases;

wherein the stereoscopic confidence weight increases as a proximity of the object position relative to a center of the stereoscopic overlap region increases; and wherein the first TDM confidence weight increases as a proximity of the object position relative to a center of the first field of view increases.

18. The imaging system of claim 4, wherein:

within an imaging distance range, the stereoscopic confidence weight and the first TDM confidence weight respectively increases and decreases as the object distance increases;

the stereoscopic confidence weight increases as a proximity of the object position relative to a center of the stereoscopic overlap region increases; and the first TDM confidence weight increases as a proximity of the object position relative to a center of the first field of view increases.

19. The imaging method of claim 11, wherein the stereoscopic confidence weight and the first TDM confidence weight are assigned based on an object distance, an object position within the first and/or the second field of view, a left-right consistency parameter associated with the stereoscopic depth information, an object orientation with respect to a stereoscopic baseline orientation associated with the stereoscopic depth information and to a TDM baseline orientation associated with the TDM depth information, an object occlusion parameter, or a combination thereof.

20. An imaging system for imaging a scene, the imaging system comprising:

a plurality of image capture devices comprising:

a first image capture device having a first field of view of the scene, the first image capture device being configured to capture first image data from the scene within the first field of view, the first image capture device comprising a first transmissive diffraction mask (TDM) configured to encode first TDM depth information about the scene in the first image data; and a second image capture device having a second field of view of the scene different from the first field of view and overlapping with the first field of view over a stereoscopic overlap region of the scene, the second image capture device being configured to capture second image data from the scene within the second field of view; and a computer device operatively coupled to the plurality of image capture devices, the computer device comprising a processor and a non-transitory computer readable storage medium having stored thereon computer readable instructions that, when executed by the processor, cause the processor to perform operations, the operations comprising:

receiving the first image data from the first image capture device;

receiving the second image data from the second image capture device;

determining stereoscopic depth information about the scene within the stereoscopic overlap region based on the first and second image data;

determining the first TDM depth information encoded in the first image data; and generating combined depth information about the scene based on the stereoscopic depth information and the first TDM depth information, wherein generating the combined depth information comprises:

assigning a stereoscopic confidence weight to the stereoscopic depth information to obtain weighted stereoscopic depth information;

assigning a first TDM confidence weight to the first TDM depth information to obtain first weighted TDM depth information; and generating the combined depth information based on the weighted stereoscopic depth information and the first weighted TDM depth information, wherein, within an imaging distance range, the stereoscopic confidence weight and the first TDM confidence weight respectively increases and decreases as the object distance increases;

wherein the stereoscopic confidence weight increases as a proximity of the object position relative to a center of the stereoscopic overlap region increases; and wherein the first TDM confidence weight increases as a proximity of the object position relative to a center of the first field of view increases.

21. The imaging system of claim 20, wherein the operations performed by the processor further comprise:

determining a stereoscopic disparity search range based on the first TDM depth information; and determining the stereoscopic depth information based on the stereoscopic disparity search range.

22. An imaging method of imaging a scene, the imaging method comprising:

capturing, with a first image capture device, first image data from the scene within a first field of view of the scene, the first image capture device comprising a first transmissive diffraction mask (TDM) configured to encode first TDM depth information about the scene in the first image data;

capturing second image data from the scene within a second field of view different from the first field of view and overlapping with the first field of view over a stereoscopic overlap region of the scene;

determining stereoscopic depth information about the scene within the stereoscopic overlap region based on the first and second image data;

determining the first TDM depth information encoded in the first image data; and generating combined depth information based on the stereoscopic depth information and the first TDM depth information, wherein the first TDM is configured to diffract a first portion of light received from the scene to generate first diffracted light, the first diffracted light encoding, as the first TDM depth information, information indicative of an angle of incidence of the received light;

wherein the first image capture device comprises a first image sensor having a first set of pixels configured to detect the first diffracted light and generate therefrom a respective first set of pixel responses as the first image data;

wherein the first set of pixels comprises a first subset of pixels and a second subset of pixels;

wherein the first set of pixel responses comprises a first subset of pixel responses corresponding to the first subset of pixels and a second subset of pixel responses corresponding to the second subset of pixels;

wherein the first subset of pixel responses and the second subset of pixel responses vary differently from each other as a function of the angle of incidence of the received light; and wherein determining the first TDM depth information comprises determining a first TDM disparity map from the first set of pixel responses, the first TDM disparity map being representative of a difference in viewpoints of the scene provided by the first subset of pixel responses and the second subset of pixel responses of the first set of pixel responses.

23. The imaging method of claim 22, further comprising:
identifying a mismatch between the stereoscopic depth information and the first TDM depth information;
determining a cause of the mismatch as relating to an anomaly in either the stereoscopic depth information or the first TDM depth information based on a stereoscopic confidence weight assigned to the stereoscopic depth information or a first TDM confidence weight assigned to the first TDM depth information; and
taking a corrective action to correct, at least in part, the anomaly.

24. The imaging method of claim 22, wherein the second image data is captured with a second image capture device distinct from the first image capture device.

* * * * *